United States Patent
Zheng et al.

(10) Patent No.: US 11,764,871 B2
(45) Date of Patent: *Sep. 19, 2023

(54) CONFORMANCE TESTING METHOD AND APPARATUS, AND STORAGE MEDIUM

(71) Applicant: Huawei Technologies Co., Ltd., Shenzhen (CN)

(72) Inventors: Jianyu Zheng, Wuhan (CN); Shengping Li, Wuhan (CN); Ting Yang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,036

(22) Filed: Mar. 30, 2022

(65) Prior Publication Data

US 2022/0222972 A1 Jul. 14, 2022

Related U.S. Application Data

(63) Continuation of application No. 17/078,920, filed on Oct. 23, 2020, now Pat. No. 11,321,562, which is a
(Continued)

(30) Foreign Application Priority Data

Apr. 27, 2018 (CN) .......................... 201810395321.4
Jun. 13, 2018 (CN) .......................... 201810609797.3

(51) Int. Cl.
*G06V 40/18* (2022.01)
*H04B 10/079* (2013.01)
(Continued)

(52) U.S. Cl.
CPC ......... *H04B 10/0799* (2013.01); *G06V 40/19* (2022.01); *G06V 40/197* (2022.01); *H04B 10/532* (2013.01); *H04B 10/54* (2013.01)

(58) Field of Classification Search
None
See application file for complete search history.

(56) References Cited

U.S. PATENT DOCUMENTS 5,774,242 A 6/1998 O'Sullivan et al.
7,032,139 B1 4/2006 Iryami et al.
(Continued)

FOREIGN PATENT DOCUMENTS

CN 103033824 A 4/2013
CN 107786305 A 3/2018
(Continued)

OTHER PUBLICATIONS

"IEE Standard for Ethernet," IEEE Std 802.3, 2018, Approved Jun. 14, 2018, 5600 pages.
(Continued)

*Primary Examiner* — Edward Park
(74) *Attorney, Agent, or Firm* — Conley Rose, P.C.

(57) ABSTRACT

A conformance testing method including: obtaining a testing symbol pattern in an optical signal; performing equalization compensation on the testing symbol pattern; generating a testing eye pattern; calculating a value of a first parameter based on the testing eye pattern and a noise enhancement coefficient, where the first parameter is used to determine a transmitter dispersion eye pattern closure degree of the optical transmitter; and when the value of the first parameter is less than or equal to a preset threshold, determining that conformance testing on the optical signal succeeds.

20 Claims, 5 Drawing Sheets

Related U.S. Application Data continuation of application No. PCT/CN2019/084181, filed on Apr. 25, 2019.

(51) Int. Cl.
*H04B 10/532* (2013.01)
*H04B 10/54* (2013.01)
*G06V 40/19* (2022.01)

(56) References Cited

U.S. PATENT DOCUMENTS

| | | |
|---|---|---|
| 8,111,986 B1 | 2/2012 | Lindsay |
| 9,608,721 B2 | 3/2017 | Dawe |
| 11,321,562 B2 * | 5/2022 | Zheng .................. H04B 14/04 |
| 2002/0196508 A1 | 12/2002 | Wei et al. |
| 2006/0263084 A1 | 11/2006 | Swenson et al. |
| 2016/0269124 A1 | 9/2016 | Doany et al. |
| 2021/0042521 A1 | 2/2021 | Zheng et al. |

FOREIGN PATENT DOCUMENTS

| | | |
|---|---|---|
| EP | 3293908 B1 | 12/2019 |
| JP | 2008526131 A | 7/2008 |

OTHER PUBLICATIONS

King, J., "TDEC for PAM4 ('TDECQ') Changes to clause 123, to replace TDP with TDECQ, rev1a" May 26, 2016, 24 pages.

* cited by examiner

Construct a histogram of a first sampling window, a histogram of a second sampling window, a histogram of a third sampling window, and a histogram of a fourth sampling window based on a testing eye pattern, where the first sampling window and the second sampling window are vertically symmetrically distributed on a left part of the testing eye pattern, and the third sampling window and the fourth sampling window are vertically symmetrically distributed on a right part of the testing eye pattern ~ S201

Determine a first standard deviation based on the histogram of the first sampling window, the histogram of the second sampling window, the histogram of the third sampling window, the histogram of the fourth sampling window, and a noise enhancement coefficient of an equalizer, where the first standard deviation is a smaller value in a second standard deviation and a third standard deviation, the second standard deviation is a standard deviation of highest additive noise that can be supported by an optical transmitter when the first sampling window and the second sampling window reach a target bit error rate, and the third standard deviation is a standard deviation of highest additive noise that can be supported by the optical transmitter when the third sampling window and the fourth sampling window reach the target bit error rate ~ S202

Determine, based on the first standard deviation, a standard deviation of highest additive noise that can be supported by the optical transmitter when the target bit error rate is reached ~ S203

Determine a value of a first parameter based on the standard deviation of the highest additive noise that can be supported by the optical transmitter when the target bit error rate is reached ~ S204

FIG. 4

CONFORMANCE TESTING METHOD AND APPARATUS, AND STORAGE MEDIUM

CROSS-REFERENCE TO RELATED APPLICATION

This is a continuation of U.S. patent application Ser. No. 17/078,920, filed on Oct. 23, 2020, which is a continuation of International Patent Application No. PCT/CN2019/084181, filed on Apr. 25, 2019, which claims priority to Chinese Patent Application No. 201810395321.4, filed on Apr. 27, 2018 and Chinese Patent Application No. 201810609797.3, filed on Jun. 13, 2018. All of the aforementioned patent applications are hereby incorporated by reference in their entireties.

TECHNICAL FIELD

Embodiments of this application relate to communications technologies, and in particular, to a conformance testing method and apparatus, and a storage medium.

BACKGROUND

A physical layer device in a data communications network includes components such as an optical transmitter, a channel (a cable or a fiber), and an optical receiver. Currently, before delivering an optical transmitter, a manufacturer of the optical transmitter performs conformance testing on the optical transmitter. It can be accurately determined, through the conformance testing, whether the optical transmitter can be compatible with a channel and/or an optical receiver provided by another manufacturer.

Currently, for an optical transmitter that modulates an optical signal using a non-return-t-zero pulse-amplitude modulation 2-level (NRZ-PAM2) scheme, conformance testing is performed on the optical transmitter using a testing parameter transmitter dispersion eye closure (TDEC) and a conformance testing method thereof. With a constant increase of a transmission rate, impact of inter-symbol interference (ISI) on quality of a transmitted data signal is increasingly severe. Therefore, equalization receiving technologies such as feed forward equalization (FFE), decision feedback equalization (DFE), and maximum likelihood sequence estimation (MLSE) are gradually introduced into a direct modulation and direct detection-based optical link. To be specific, when receiving an optical signal transmitted by the optical transmitter using the NRZ-PAM2 scheme, an optical receiver performs equalization processing on the optical signal.

However, because a change of optical signal quality caused by equalization receiving of an optical receiver is not considered in an existing conformance testing solution, when an optical receiver uses an equalization receiving manner, how to determine whether an optical signal transmitted by an optical transmitter using the NRZ-PAM2 scheme can meet a use requirement of the optical receiver is a problem to be urgently resolved.

SUMMARY

Embodiments of this application provide a conformance testing method and apparatus, and a storage medium, to resolve a technical problem in other approaches that when an optical receiver receives, in an equalization receiving manner, an optical signal transmitted by an optical transmitter using an NRZ-PAM2 scheme, it cannot be determined whether the optical signal transmitted by the optical transmitter using the NRZ-PAM2 scheme can meet a use requirement of the optical receiver.

According to a first aspect, an embodiment of this application provides a conformance testing method, where the method includes: obtaining a testing symbol pattern in an optical signal transmitted by an optical transmitter, where the optical signal is generated by the optical transmitter through modulation using a non-return to zero pulse amplitude modulation 2-level scheme; performing equalization compensation on the testing symbol pattern, and generating a testing eye pattern through composition using the testing symbol pattern on which the equalization compensation has been performed; calculating, based on the testing eye pattern and a noise enhancement coefficient that corresponds to the equalization compensation, a value of a first parameter, where the first parameter is used to determine a transmitter dispersion eye pattern closure degree of the optical transmitter; and when the value of the first parameter is less than or equal to a preset threshold, determining that conformance testing on the optical signal succeeds.

According to the conformance testing method provided in the first aspect, the equalization compensation is performed on the testing symbol pattern in the optical signal transmitted by the optical transmitter using the NRZ-PAM2 scheme, and the value of the first parameter used to determine the transmitter dispersion eye pattern closure degree of the optical transmitter is calculated based on the testing eye pattern and the noise enhancement coefficient that corresponds to the equalization compensation, where the testing eye pattern is obtained through composition using the testing symbol pattern on which the equalization compensation has been performed, such that it can be determined, based on the value of the first parameter, whether the optical signal transmitted by the optical transmitter using the NRZ-PAM2 scheme can meet a use requirement of an optical receiver when the optical receiver uses an equalization receiving manner.

In a possible implementation, if the optical signal is transmitted by the optical transmitter under highest relative intensity noise, that the conformance testing on the optical signal succeeds is used to represent that conformance testing on the optical transmitter succeeds.

According to the conformance testing method provided in the possible implementation, the testing symbol pattern in the optical signal transmitted, under the highest relative intensity noise, by the optical transmitter using the NRZ-PAM2 scheme is obtained, the equalization compensation is performed on the testing symbol pattern, and the value of the first parameter used to determine the transmitter dispersion eye pattern closure degree of the optical transmitter is calculated based on the testing eye pattern and the noise enhancement coefficient that corresponds to the equalization compensation, where the testing eye pattern is obtained through composition using the testing symbol pattern on which the equalization compensation has been performed, such that it can be determined, based on the value of the first parameter, whether the conformance testing on the optical transmitter using the NRZ-PAM2 scheme succeeds when the optical receiver uses the equalization receiving manner.

In a possible implementation, the calculating a value of a first parameter based on the testing eye pattern and the noise enhancement coefficient includes: constructing a histogram of a first sampling window, a histogram of a second sampling window, a histogram of a third sampling window, and a histogram of a fourth sampling window based on the testing eye pattern, where the first sampling window and the second sampling window are vertically symmetrically distributed on a left part of the testing eye pattern, and where the third sampling window and the fourth sampling window are vertically symmetrically distributed on a right part of the testing eye pattern; determining a first standard deviation based on the histogram of the first sampling window, the histogram of the second sampling window, the histogram of the third sampling window, the histogram of the fourth sampling window, and the noise enhancement coefficient, where the first standard deviation is a smaller value in a second standard deviation and a third standard deviation, the second standard deviation is a standard deviation of highest additive noise that can be supported by the optical transmitter when the first sampling window and the second sampling window reach a target bit error rate, and where the third standard deviation is a standard deviation of highest additive noise that can be supported by the optical transmitter when the third sampling window and the fourth sampling window reach the target bit error rate; determining, based on the first standard deviation, a standard deviation of highest additive noise that can be supported by the optical transmitter when the target bit error rate is reached; and determining the value of the first parameter based on the standard deviation of the highest additive noise that can be supported by the optical transmitter when the target bit error rate is reached.

According to the conformance testing method provided in the possible implementation, the testing eye pattern may not be horizontally symmetrical due to a factor such as performance of the optical transmitter, the standard deviation of the highest additive noise that can be supported by the optical transmitter when the target bit error rate is reached can be accurately obtained using the sampling windows disposed on the left part and the right part of the testing eye pattern. Further, it can be accurately determined, based on the standard deviation of the highest additive noise that can be supported by the optical transmitter when the target bit error rate is reached, that the optical signal transmitted by the optical transmitter can meet the use requirement of the optical receiver.

In a possible implementation, the determining a first standard deviation based on the histogram of the first sampling window, the histogram of the second sampling window, the histogram of the third sampling window, the histogram of the fourth sampling window, and the noise enhancement coefficient includes: determining the second standard deviation based on the histogram of the first sampling window, the histogram of the second sampling window, and the noise enhancement coefficient; determining the third standard deviation based on the histogram of the third sampling window, the histogram of the fourth sampling window, and the noise enhancement coefficient; and using the smaller value in the second standard deviation and the third standard deviation as the first standard deviation.

According to the conformance testing method provided in the possible implementation, because a smaller standard deviation indicates worse highest additive noise that can be supported by the optical transmitter when the target bit error rate is reached, the smaller value in the second standard deviation and the third standard deviation is used as the first standard deviation. As such, it can be determined, using worse highest additive noise, whether the optical signal transmitted by the optical transmitter meets the use requirement of the optical receiver, and a determining result is more accurate and reliable.

In a possible implementation, all sampling points included in the first sampling window are located on an upper eyelid on the testing eye pattern and are higher than an average optical power of the testing eye pattern, all sampling points included in the second sampling window are located on a lower eyelid on the testing eye pattern and are lower than the average optical power of the testing eye pattern, and the determining the second standard deviation based on the histogram of the first sampling window, the histogram of the second sampling window, and the noise enhancement coefficient includes: determining a histogram distribution function of the first sampling window based on the histogram of the first sampling window, and determining a histogram distribution function of the second sampling window based on the histogram of the second sampling window; and determining the second standard deviation based on the histogram distribution function of the first sampling window, the histogram distribution function of the second sampling window, the target bit error rate, and a normal distribution curve function, where the normal distribution curve function is determined based on the noise enhancement coefficient, the average optical power of the testing eye pattern, and the second standard deviation.

According to the conformance testing method provided in the possible implementation, because a histogram distribution function is used to represent a probability distribution of sampling point distortion degrees in a sampling window, and the normal distribution curve function is used to represent a probability distribution of the highest additive noise that can be supported by the optical transmitter when the first sampling window and the second sampling window reach the target bit error rate, the standard deviation of the highest additive noise that can be supported by the optical transmitter when the first sampling window and the second sampling window reach the target bit error rate can be accurately determined with reference to the histogram distribution function, the target bit error rate, and the normal distribution curve function.

In a possible implementation, that the normal distribution curve function is determined based on the noise enhancement coefficient, the average optical power of the testing eye pattern, and the second standard deviation includes: the normal distribution curve function is determined according to $$Q(x) = \int_X^\infty \frac{(-z^2/2)}{\sqrt{2\pi}} dz,$$

where $Q(x)$ is the normal distribution curve function, $$x = \frac{y - P_{ave}}{C_{eq} \cdot \sigma_L},$$

y is an independent variable of x, a value range of y is an interval between a largest value and a smallest value in optical power values corresponding to the sampling points in the first sampling window and the second sampling window, $P_{ave}$ is the average optical power of the testing eye pattern, $\sigma_L$ is the second standard deviation, $C_{eq}$ is the noise enhancement coefficient, and z is an integral variable of the normal distribution curve function.

According to the conformance testing method provided in the possible implementation, the normal distribution curve function obtained with reference to the noise enhancement coefficient corresponding to the equalization compensation, the average optical power of the testing eye pattern, and the second standard deviation can accurately reflect the probability distribution of the highest additive noise that can be supported by the optical transmitter when the first sampling window and the second sampling window reach the target bit error rate.

In a possible implementation, the determining the second standard deviation based on the histogram distribution function of the first sampling window, the histogram distribution function of the second sampling window, the target bit error rate, and a normal distribution curve function includes: determining, through numerical simulation, the second standard deviation meeting a first formula, where the first formula is:

$$\frac{1}{2}\left(\frac{\int f_{ul}(y)Q(x)dy}{\int f_{ul}(y)dy}\right) + \frac{1}{2}\left(\frac{\int f_u(y)Q(x)dy}{\int f_u(y)dy}\right) = BER_{target},$$

where $f_{ul}(y)$ is the histogram distribution function of the first sampling window, where $Q(x)$ is the normal distribution curve function, $f_u(y)$ is the histogram distribution function of the second sampling window, and where $BER_{target}$ is the target bit error rate.

According to the conformance testing method provided in the possible implementation, dividing a result of performing multiplication and integration on the histogram distribution function and the normal distribution curve function by an integral of the histogram distribution function may represent, in a normalized manner, a probability (namely, a bit error rate (BER)) that the optical receiver wrongly determines the optical signal when noise is $\sigma_L$. Therefore, $\sigma_L$ corresponding to the target bit error rate is calculated. As such, the standard deviation of the highest additive noise that can be supported by the optical transmitter when the first sampling window and the second sampling window reach the target bit error rate can be accurately estimated.

In a possible implementation, the determining the value of the first parameter based on the standard deviation of the highest additive noise that can be supported by the optical transmitter when the target bit error rate is reached includes: determining the value of the first parameter according to $$T = 10\log_{10}\left(\frac{OMA}{2Q} \times \frac{1}{R}\right) + M,$$

where T is the first parameter, OMA is an optical modulation amplitude, Q is a preset Q factor, R is the standard deviation of the highest additive noise that can be supported by the optical transmitter when the target bit error rate is reached, M is a first compensation factor, and M is determined based on an extinction ratio of the testing eye pattern.

According to the conformance testing method provided in the possible implementation, because a ratio of the OMA to the preset Q factor may represent a standard deviation of highest additive noise that can be supported by an ideal optical transmitter when the target bit error rate is reached, a ratio of the standard deviation of the highest additive noise that can be supported by the ideal optical transmitter when the target bit error rate is reached to a standard deviation of highest additive noise that can be supported by a to-be-tested optical transmitter when the target bit error rate is reached can be obtained by dividing the ratio of the OMA to the preset Q factor by the standard deviation R of the highest additive noise that can be supported by the to-be-tested optical transmitter when the target bit error rate is reached. It can be accurately determined, using the ratio, that the optical signal transmitted by the optical transmitter can meet the use requirement of the optical receiver.

In a possible implementation, the preset Q factor is a Q factor of a preset eye pattern under the target bit error rate, and the preset eye pattern is an eye pattern that is free of inter-symbol interference and noise.

According to the conformance testing method provided in the possible implementation, the Q factor of the preset eye pattern under the target bit error rate is used as the preset Q factor. As such, the standard deviation of the highest additive noise that can be supported by the ideal optical transmitter when the target bit error rate is reached can be obtained using the ratio of the optical modulation amplitude and the preset Q factor.

In a possible implementation, the determining, based on the first standard deviation, a standard deviation of highest additive noise that can be supported by the optical transmitter when the target bit error rate is reached includes: determining, based on the first standard deviation and a fourth standard deviation, the standard deviation of the highest additive noise that can be supported by the optical transmitter when the target bit error rate is reached, where the fourth standard deviation is a variance of base noise sums of the optical receiver side.

According to the conformance testing method provided in the possible implementation, because data needed for constructing the testing eye pattern or extracting a histogram distribution function of a sampling window includes base noise of the receive end, and the base noise of the receive end does not exist in a real transmission scenario, the base noise of the receive end leads to the smaller standard deviation, represented by the first standard deviation, of the highest additive noise that can be supported by the optical transmitter when the target bit error rate is reached. Therefore, the base noise of the receive end and the first standard deviation are combined, such that accuracy of the obtained standard deviation of the highest additive noise that can be supported by the optical transmitter when the target bit error rate is reached can be ensured.

In a possible implementation, the determining, based on the first standard deviation and a fourth standard deviation, the standard deviation of the highest additive noise that can be supported by the optical transmitter when the target bit error rate is reached includes: calculating a square root of a sum of the square of the first standard deviation and the square of the fourth standard deviation, to obtain the standard deviation of the highest additive noise that can be supported by the optical transmitter when the target bit error rate is reached.

In a possible implementation, all sampling points included in the first sampling window are located on an upper eyelid on the testing eye pattern and are higher than an average optical power of the testing eye pattern, all sampling points included in the second sampling window are located on a lower eyelid on the testing eye pattern and are lower than the average optical power of the testing eye pattern, and the determining the second standard deviation based on the histogram of the first sampling window, the histogram of the second sampling window, and the noise enhancement coefficient includes: determining a histogram distribution function of the first sampling window based on the histogram of the first sampling window, and determining a histogram distribution function of the second sampling window based on the histogram of the second sampling window; and determining the second standard deviation based on the histogram distribution function of the first sampling window, the histogram distribution function of the second sampling window, the target bit error rate, a normal distribution curve function of the first sampling window, and a normal distribution curve function of the second sampling window, where the normal distribution curve function of the first sampling window is determined based on the noise enhancement coefficient, a preset optical power threshold, the second standard deviation, and a second compensation factor, where the normal distribution curve function of the second sampling window is determined based on the noise enhancement coefficient, the preset optical power threshold, and the second standard deviation, and where the second compensation factor is determined based on an extinction ratio of the testing eye pattern.

According to the conformance testing method provided in the possible implementation, because a histogram distribution function is used to represent a probability distribution of sampling point distortion degrees in a sampling window, and a normal distribution curve function is used to represent a probability distribution of highest additive noise that can be supported by the optical transmitter when a sampling window reaches the target bit error rate, the standard deviation of the highest additive noise that can be supported by the optical transmitter when the first sampling window and the second sampling window reach the target bit error rate can be accurately determined with reference to the histogram distribution functions, the target bit error rate, and the normal distribution curve functions.

In a possible implementation, that the normal distribution curve function of the first sampling window is determined based on the noise enhancement coefficient, the preset optical power threshold, the second standard deviation, and the second compensation factor includes: the normal distribution curve function of the first sampling window is determined according to $$Q(x_{ul}) = \int_{x_{ul}}^{\infty} \frac{(-z^2/2)}{\sqrt{2\pi}} dz;$$

and that the normal distribution curve function of the second sampling window is determined based on the noise enhancement coefficient, the preset optical power threshold, and the second standard deviation includes: the normal distribution curve function of the second sampling window is determined according to $$Q(x_{ll}) = \int_{x_{ll}}^{\infty} \frac{(-z^2/2)}{\sqrt{2\pi}} dz,$$

where $Q(x_{ul})$ is the normal distribution curve function of the first sampling window, $$x_{ul} = \frac{y - P_{th}}{C_{eq} \cdot M_1 \cdot \sigma_L},$$

$Q(x_u)$ is the normal distribution curve function of the second sampling window, $$x_{ll} = \frac{P_{th} - y}{C_{eq} \cdot \sigma_L},$$

y is an independent variable of $x_{ul}$ and $x_u$, a value range of y is an interval between a largest value and a smallest value in optical power values corresponding to the sampling points in the first sampling window and the second sampling window, $P_{th}$ is the preset optical power threshold, $\sigma_L$ is the second standard deviation, $C_{eq}$ is the noise enhancement coefficient, $M_1$ is the second compensation factor, and z is an integral variable of the normal distribution curve function.

According to the conformance testing method provided in the possible implementation, for a feature that the standard deviation of the highest additive noise that can be supported when the upper eyelid and the lower eyelid on the testing eye pattern reach the target bit error rate changes with the extinction ratio of the eye pattern, normal distribution curve functions of sampling windows in different locations on the testing eye pattern are determined in a differentiated manner using the second compensation factor determined based on the extinction ratio of the testing eye pattern, such that a probability distribution of highest additive noise that can be supported by the optical transmitter when each sampling window reaches the target bit error rate can be accurately reflected.

In a possible implementation, the determining the second standard deviation based on the histogram distribution function of the first sampling window, the histogram distribution function of the second sampling window, the target bit error rate, a normal distribution curve function of the first sampling window, and a normal distribution curve function of the second sampling window includes: determining, through numerical simulation, the second standard deviation meeting a second formula, where the second formula is:

$$\frac{1}{2}\left(\frac{\int f_{ul}(y)Q(x_{ul})dy}{\int f_{ul}(y)dy}\right) + \frac{1}{2}\left(\frac{\int f_{ll}(y)Q(x_{ll})dy}{\int f_{ll}(y)dy}\right) = BER_{target},$$

where $f_{ul}(y)$ is the histogram distribution function of the first sampling window, where $f_{ll}(y)$ is the histogram distribution function of the second sampling window, and where $BER_{target}$ is the target bit error rate.

According to the conformance testing method provided in the possible implementation, dividing a result of performing multiplication and integration on the histogram distribution function and the normal distribution curve function by an integral of the histogram distribution function may represent, in a normalized manner, a probability (namely, a bit error rate) that the optical receiver wrongly determines the optical signal when noise is $\sigma_L$. Therefore, $\sigma_L$ corresponding to the target bit error rate is calculated, such that the standard deviation of the highest additive noise that can be supported by the optical transmitter when the first sampling window and the second sampling window reach the target bit error rate can be accurately estimated.

In a possible implementation, the determining, based on the first standard deviation, a standard deviation of highest additive noise that can be supported by the optical transmitter when the target bit error rate is reached includes:

determining, based on the first standard deviation, the second compensation factor, and a fourth standard deviation, the standard deviation of the highest additive noise that can be supported by the optical transmitter when the target bit error rate is reached, where the fourth standard deviation is a variance of base noise sums of the optical receiver side.

According to the conformance testing method provided in the possible implementation, because data needed for constructing the testing eye pattern or extracting a histogram distribution function of a sampling window includes base noise of the receive end, and the base noise of the receive end does not exist in a real transmission scenario, the base noise of the receive end leads to the smaller standard deviation, represented by the first standard deviation, of the highest additive noise that can be supported by the optical transmitter when the target bit error rate is reached. Therefore, the base noise of the receive end, the second compensation factor, and the first standard deviation are combined, such that accuracy of the obtained standard deviation of the highest additive noise that can be supported by the optical transmitter when the target bit error rate is reached can be ensured.

In a possible implementation, the determining, based on the first standard deviation, the second compensation factor, and a fourth standard deviation, the standard deviation of the highest additive noise that can be supported by the optical transmitter when the target bit error rate is reached includes: determining, according to $R = \sqrt{[(1+M_1)\sigma_G]^2 + \sigma_S^2}$, the standard deviation of the highest additive noise that can be supported by the optical transmitter when the target bit error rate is reached, where R is the standard deviation of the highest additive noise that can be supported by the optical transmitter when the target bit error rate is reached, $M_1$ is the second compensation factor, $\sigma_G$ is the first standard deviation, and $\sigma_S$ is the fourth standard deviation.

In a possible implementation, the determining the value of the first parameter based on the standard deviation of the highest additive noise that can be supported by the optical transmitter when the target bit error rate is reached includes: determining the value of the first parameter according to $$T = 10 \log_{10}\left(\frac{R_{preset}}{R}\right),$$

where T is the first parameter, $R_{preset}$ is a standard deviation of highest additive noise that can be supported by a preset optical transmitter when the target bit error rate is reached, R is the standard deviation of the highest additive noise that can be supported by the optical transmitter when the target bit error rate is reached, and an optical signal transmitted by the preset optical transmitter is free of noise, jittering, and inter-symbol interference.

According to the conformance testing method provided in the possible implementation, because $R_{preset}$ may represent a standard deviation of highest additive noise that can be supported by an ideal optical transmitter when the target bit error rate is reached, a ratio of the standard deviation of the highest additive noise that can be supported by the ideal optical transmitter when the target bit error rate is reached to a standard deviation of highest additive noise that can be supported by a to-be-tested optical transmitter when the target bit error rate is reached can be obtained by dividing $R_{preset}$ by the standard deviation R of the highest additive noise that can be supported by the to-be-tested optical transmitter when the target bit error rate is reached. It can be accurately determined, using the ratio, that the optical signal transmitted by the optical transmitter can meet the use requirement of the optical receiver.

In a possible implementation, the method further includes: obtaining a preset eye pattern that is obtained based on the optical signal transmitted by the preset optical transmitter; and determining, based on a normal distribution curve function of an upper eyelid on the preset eye pattern, a normal distribution curve function of a lower eyelid on the preset eye pattern, and the target bit error rate, the standard deviation of the highest additive noise that can be supported by the preset optical transmitter when the target bit error rate is reached.

In a possible implementation, the determining, based on a normal distribution curve function of an upper eyelid on the preset eye pattern, a normal distribution curve function of a lower eyelid on the preset eye pattern, and the target bit error rate, the standard deviation of the highest additive noise that can be supported by the preset optical transmitter when the target bit error rate is reached includes: determining, through numerical simulation, a first standard deviation that meets a third formula and that corresponds to the preset optical transmitter; and determining, based on the first standard deviation corresponding to the preset optical transmitter, the standard deviation of the highest additive noise that can be supported by the preset optical transmitter when the target bit error rate is reached, where the third formula is:

$$\frac{1}{2}[Q(x_u) + Q(x_l)] = BER_{target},$$

where $Q(x_u)$ is the normal distribution curve function of the upper eyelid on the preset eye pattern, $$Q(x_u) = \int_{x_u}^{\infty} \frac{(-z^2/2)}{\sqrt{2\pi}} dz, \quad x_u = \frac{P_{u_{ideal}} - P_{th}}{M_2 \cdot \sigma_{ideal}},$$

$Q(x_l)$ is the normal distribution curve function of the lower eyelid on the preset eye pattern, $$Q(x_l) = \int_{x_l}^{\infty} \frac{(-z^2/2)}{\sqrt{2\pi}} dz, \quad x_l = \frac{P_{th} - P_{l_{ideal}}}{\sigma_{ideal}},$$

$P_{u_{ideal}}$ is an average optical power value of the upper eyelid on the preset eye pattern, $P_{l_{ideal}}$ is an average optical power value of the lower eyelid on the preset eye pattern, $P_{th}$ is the preset optical power threshold, $\sigma_{ideal}$ is the first standard deviation corresponding to the preset optical transmitter, z is an integral variable of the normal distribution curve function, $M_2$ is a third compensation factor, and the third compensation factor is determined based on an extinction ratio of the preset eye pattern.

In a possible implementation, the noise enhancement coefficient is determined based on normalized noise power spectrum density that is of an input end and that corresponds to the equalization compensation and a normalized frequency response corresponding to the equalization compensation.

In a possible implementation, that the noise enhancement coefficient is determined based on the normalized noise power spectrum density that is of the input end and that corresponds to the equalization compensation and the normalized frequency response corresponding to the equalization compensation includes: the noise enhancement coefficient is determined according to $C_{eq}=\sqrt{\int_f N(f) \times H_{eq}(f) df}$, or the noise enhancement coefficient is determined according to $C_{eq}=\sqrt{\int_f N(f) \times |H_{eq}(f)|^2 df}$, where $f$ is a frequency, $N(f)$ is the normalized noise power spectrum density that is of the input end and that corresponds to the equalization compensation, $H_{eq}(f)$ is the normalized frequency response corresponding to the equalization compensation, $\int_f N(f)df$ is equal to 1, and $H_{eq}(f)$ is equal to 1 when $f$ is equal to 0.

According to a second aspect, an embodiment of this application provides a conformance testing apparatus, where the apparatus includes: an obtaining module configured to obtain a testing symbol pattern in an optical signal transmitted by an optical transmitter, where the optical signal is generated by the optical transmitter through modulation using a non-return to zero pulse amplitude modulation 2-level scheme; a processing module configured to perform equalization compensation on the testing symbol pattern, and obtain a testing eye pattern through composition using a testing symbol pattern on which the equalization compensation has been performed; and calculate a value of a first parameter based on the testing eye pattern and a noise enhancement coefficient that corresponds to the equalization compensation, where the first parameter is used to determine a transmitter dispersion eye pattern closure degree of the optical transmitter; and a determining module configured to: when the value of the first parameter is less than or equal to a preset threshold, determine that conformance testing on the optical signal succeeds.

In a possible implementation, if the optical signal is transmitted by the optical transmitter under highest relative intensity noise, that the conformance testing on the optical signal succeeds is used to represent that conformance testing on the optical transmitter succeeds.

In a possible implementation, the processing module is configured to construct a histogram of a first sampling window, a histogram of a second sampling window, a histogram of a third sampling window, and a histogram of a fourth sampling window based on the testing eye pattern; determine a first standard deviation based on the histogram of the first sampling window, the histogram of the second sampling window, the histogram of the third sampling window, the histogram of the fourth sampling window, and the noise enhancement coefficient; determine, based on the first standard deviation, a standard deviation of highest additive noise that can be supported by the optical transmitter when a target bit error rate is reached; and determine the value of the first parameter based on the standard deviation of the highest additive noise that can be supported by the optical transmitter when the target bit error rate is reached, where the first sampling window and the second sampling window are vertically symmetrically distributed on a left part of the testing eye pattern, the third sampling window and the fourth sampling window are vertically symmetrically distributed on a right part of the testing eye pattern, the first standard deviation is a smaller value in a second standard deviation and a third standard deviation, the second standard deviation is a standard deviation of highest additive noise that can be supported by the optical transmitter when the first sampling window and the second sampling window reach the target bit error rate, and the third standard deviation is a standard deviation of highest additive noise that can be supported by the optical transmitter when the third sampling window and the fourth sampling window reach the target bit error rate.

In a possible implementation, the processing module is configured to determine the second standard deviation based on the histogram of the first sampling window, the histogram of the second sampling window, and the noise enhancement coefficient; determine the third standard deviation based on the histogram of the third sampling window, the histogram of the fourth sampling window, and the noise enhancement coefficient; and use the smaller value in the second standard deviation and the third standard deviation as the first standard deviation.

In a possible implementation, all sampling points included in the first sampling window are located on an upper eyelid on the testing eye pattern and are higher than an average optical power of the testing eye pattern, all sampling points included in the second sampling window are located on a lower eyelid on the testing eye pattern and are lower than the average optical power of the testing eye pattern, and the processing module is configured to determine a histogram distribution function of the first sampling window based on the histogram of the first sampling window, determine a histogram distribution function of the second sampling window based on the histogram of the second sampling window, and determine the second standard deviation based on the histogram distribution function of the first sampling window, the histogram distribution function of the second sampling window, the target bit error rate, and a normal distribution curve function, where the normal distribution curve function is determined based on the noise enhancement coefficient, the average optical power of the testing eye pattern, and the second standard deviation.

In a possible implementation, that the normal distribution curve function is determined based on the noise enhancement coefficient, the average optical power of the testing eye pattern, and the second standard deviation includes: the normal distribution curve function is determined according to $$Q(x) = \int_x^\infty \frac{(-z^2/2)}{\sqrt{2\pi}} dz,$$

where $Q(x)$ is the normal distribution curve function, $$x = \frac{y - P_{ave}}{C_{eq} \cdot \sigma_L},$$

$y$ is an independent variable of $x$, a value range of $y$ is an interval between a largest value and a smallest value in optical power values corresponding to the sampling points in the first sampling window and the second sampling window, $P_{ave}$ is the average optical power of the testing eye pattern, $\sigma_L$ is the second standard deviation, $C_{eq}$ is the noise enhancement coefficient, and $z$ is an integral variable of the normal distribution curve function.

In a possible implementation, the processing module is configured to determine, through numerical simulation, the second standard deviation meeting a first formula, where the first formula is:

$$\frac{1}{2}\left(\frac{\int f_{ul}(y)Q(x)dy}{\int f_{ul}(y)dy}\right) + \frac{1}{2}\left(\frac{\int f_{ll}(y)Q(x)dy}{\int f_{ll}(y)dy}\right) = BER_{target},$$

where $f_{ul}$ (y) is the histogram distribution function of the first sampling window, Q(x) is the normal distribution curve function, $f_u$ (y) is the histogram distribution function of the second sampling window, and $BER_{target}$ is the target bit error rate.

In a possible implementation, the processing module is configured to determine the value of the first parameter according to $$T = 10\log_{10}\left(\frac{OMA}{2Q} \times \frac{1}{R}\right) + M,$$

where T is the first parameter, OMA is an optical modulation amplitude, Q is a preset Q factor, R is the standard deviation of the highest additive noise that can be supported by the optical transmitter when the target bit error rate is reached, M is a first compensation factor, and M is determined based on an extinction ratio of the testing eye pattern.

In a possible implementation, the preset Q factor is a Q factor of a preset eye pattern under the target bit error rate, and the preset eye pattern is an eye pattern that is free of inter-symbol interference and noise.

In a possible implementation, the processing module is configured to determine, based on the first standard deviation and a fourth standard deviation, the standard deviation of the highest additive noise that can be supported by the optical transmitter when the target bit error rate is reached, where the fourth standard deviation is a variance of base noise sums of an optical receiver side.

In a possible implementation, the processing module is configured to calculate a square root of a sum of the square of the first standard deviation and the square of the fourth standard deviation, to obtain the standard deviation of the highest additive noise that can be supported by the optical transmitter when the target bit error rate is reached.

In a possible implementation, all sampling points included in the first sampling window are located on an upper eyelid on the testing eye pattern and are higher than an average optical power of the testing eye pattern, all sampling points included in the second sampling window are located on a lower eyelid on the testing eye pattern and are lower than the average optical power of the testing eye pattern, and the processing module is configured to determine a histogram distribution function of the first sampling window based on the histogram of the first sampling window, determine a histogram distribution function of the second sampling window based on the histogram of the second sampling window, and determine the second standard deviation based on the histogram distribution function of the first sampling window, the histogram distribution function of the second sampling window, the target bit error rate, a normal distribution curve function of the first sampling window, and a normal distribution curve function of the second sampling window, where the normal distribution curve function of the first sampling window is determined based on the noise enhancement coefficient, a preset optical power threshold, the second standard deviation, and a second compensation factor, the normal distribution curve function of the second sampling window is determined based on the noise enhancement coefficient, the preset optical power threshold, and the second standard deviation, and the second compensation factor is determined based on an extinction ratio of the testing eye pattern.

In a possible implementation, that the normal distribution curve function of the first sampling window is determined based on the noise enhancement coefficient, the preset optical power threshold, the second standard deviation, and the second compensation factor includes: the normal distribution curve function of the first sampling window is determined according to $$Q(x_{ul}) = \int_{x_{ul}}^{\infty} \frac{(-z^2/2)}{\sqrt{2\pi}} dz;$$

and that the normal distribution curve function of the second sampling window is determined based on the noise enhancement coefficient, the preset optical power threshold, and the second standard deviation includes: the normal distribution curve function of the second sampling window is determined according to $$Q(x_{ll}) = \int_{x_{ll}}^{\infty} \frac{(-z^2/2)}{\sqrt{2\pi}} dz,$$

where $Q(x_{ul})$ is the normal distribution curve function of the first sampling window, $$x_{ul} = \frac{y - P_{th}}{C_{eq} \cdot M_1 \cdot \sigma_L},$$

$Q(x_u)$ is the normal distribution curve function of the second sampling window, $$x_{ll} = \frac{P_{th} - y}{C_{eq} \cdot \sigma_L},$$

y is an independent variable of $x_{ul}$ and $x_u$, a value range of y is an interval between a largest value and a smallest value in optical power values corresponding to the sampling points in the first sampling window and the second sampling window, $P_{th}$ is the preset optical power threshold, $\sigma_L$ is the second standard deviation, $C_{eq}$ is the noise enhancement coefficient, $M_1$ is the second compensation factor, and z is an integral variable of the normal distribution curve function.

In a possible implementation, the processing module is configured to determine, through numerical simulation, the second standard deviation meeting a second formula, where the second formula is:

$$\frac{1}{2}\left(\frac{\int f_{ul}(y)Q(x_{ul})dy}{\int f_{ul}(y)dy}\right) + \frac{1}{2}\left(\frac{\int f_{ll}(y)Q(x_{ll})dy}{\int f_{ll}(y)dy}\right) = BER_{target},$$

where $f_{ul}$ (y) is the histogram distribution function of the first sampling window, $f_u$ (y) is the histogram distribution function of the second sampling window, and $BER_{target}$ is the target bit error rate.

In a possible implementation, the processing module is configured to determine, based on the first standard deviation, the second compensation factor, and a fourth standard deviation, the standard deviation of the highest additive noise that can be supported by the optical transmitter when the target bit error rate is reached, where the fourth standard deviation is a variance of base noise sums of an optical receiver side.

In a possible implementation, the processing module is configured to determine, according to $R=\sqrt{[(1+M_1)\sigma_G]^2+\sigma_S^2}$, the standard deviation of the highest additive noise that can be supported by the optical transmitter when the target bit error rate is reached, where R is the standard deviation of the highest additive noise that can be supported by the optical transmitter when the target bit error rate is reached, $M_1$ is the second compensation factor, $\sigma_G$ is the first standard deviation, and $\sigma_S$ is the fourth standard deviation.

In a possible implementation, the processing module is configured to determine the value of the first parameter according to $$T - 10 \log_{10}\left(\frac{R_{present}}{R}\right),$$

where T is the first parameter, $R_{preset}$ is a standard deviation of highest additive noise that can be supported by a preset optical transmitter when the target bit error rate is reached, R is the standard deviation of the highest additive noise that can be supported by the optical transmitter when the target bit error rate is reached, and an optical signal transmitted by the preset optical transmitter is free of noise, jittering, and inter-symbol interference.

In a possible implementation, the processing module is further configured to obtain a preset eye pattern that is obtained based on the optical signal transmitted by the preset optical transmitter, and determine, based on a normal distribution curve function of an upper eyelid on the preset eye pattern, a normal distribution curve function of a lower eyelid on the preset eye pattern, and the target bit error rate, the standard deviation of the highest additive noise that can be supported by the preset optical transmitter when the target bit error rate is reached.

In a possible implementation, the processing module is configured to determine, through numerical simulation, a first standard deviation that meets a third formula and that corresponds to the preset optical transmitter, and determine, based on the first standard deviation corresponding to the preset optical transmitter, the standard deviation of the highest additive noise that can be supported by the preset optical transmitter when the target bit error rate is reached, where the third formula is: $\frac{1}{2} [Q(x_u)+Q(x_l)]=BER_{target}$, where $Q(x_u)$ is the normal distribution curve function of the upper eyelid on the preset eye pattern, $$Q(x_u) = \int_{x_u}^{\infty} \frac{(-z^2/2)}{\sqrt{2\pi}} dz, x_u = \frac{P_{u_{ideal}} - P_{th}}{M_2 \cdot \sigma_{ideal}},$$

$Q(x_l)$ is the normal distribution curve function of the lower eyelid on the preset eye pattern, $$Q(x_l) = \int_{x_l}^{\infty} \frac{(-z^2/2)}{\sqrt{2\pi}} dz, x_l = \frac{P_{th} - P_{l_{ideal}}}{\sigma_{ideal}},$$

$P_{u_{ideal}}$ is an average optical power value of the upper eyelid on the preset eye pattern, $P_{l_{ideal}}$ is an average optical power value of the lower eyelid on the preset eye pattern, $P_{th}$ is the preset optical power threshold, $\sigma_{ideal}$ is the first standard deviation corresponding to the preset optical transmitter, z is an integral variable of the normal distribution curve function, $M_2$ is a third compensation factor, and the third compensation factor is determined based on an extinction ratio of the preset eye pattern.

In a possible implementation, the noise enhancement coefficient is determined based on normalized noise power spectrum density that is of an input end and that corresponds to the equalization compensation and a normalized frequency response corresponding to the equalization compensation.

In a possible implementation, that the noise enhancement coefficient is determined based on the normalized noise power spectrum density that is of the input end and that corresponds to the equalization compensation and the normalized frequency response corresponding to the equalization compensation includes: the noise enhancement coefficient is determined according to $C_{eq}=\sqrt{\int_f N(f) \times H_{eq}(f) df}$, or the noise enhancement coefficient is determined according to $C_{eq}=\sqrt{\int_f N(f) \times |H_{eq}(f)|^2 df}$, where $f$ is a frequency, $N(f)$ is the normalized noise power spectrum density that is of the input end and that corresponds to the equalization compensation, $H_{eq}(f)$ is the normalized frequency response corresponding to the equalization compensation, $\int_f N(f) df$ is equal to 1, and $H_{eq}(f)$ is equal to 1 when $f$ is equal to 0.

For beneficial effects of the conformance testing apparatus provided in any one of the second aspect and the possible implementations of the second aspect, refer to the beneficial effects of any one of the first aspect and the possible implementations of the first aspect. Details are not described herein again.

According to a third aspect, an embodiment of this application provides a conformance testing apparatus, where the conformance testing apparatus includes a processor and a memory, where the memory is configured to store computer executable program code, where the program code includes an instruction, and when the processor executes the instruction, the instruction enables the conformance testing apparatus to perform the conformance testing method provided in any one of the first aspect and the possible implementations of the first aspect.

According to a fourth aspect, an embodiment of this application provides a conformance testing apparatus, including units, modules, or circuits configured to perform the method provided in any one of the first aspect and the possible implementations of the first aspect. The conformance testing apparatus may be a processing device, or may be a module used in the processing device, for example, a chip used in an oscilloscope.

According to a fifth aspect, an embodiment of this application provides a computer program product including an instruction. When the computer program product is run on a computer, the computer is enabled to perform the method provided in any one of the first aspect and the possible implementations of the first aspect.

According to a sixth aspect, an embodiment of this application provides a computer readable storage medium. The computer readable storage medium stores an instruction, and when the instruction is run on a computer, the computer is enabled to perform the method provided in any one of the first aspect and the possible implementations of the first aspect.

According to the conformance testing method and apparatus, and the storage medium that are provided in the embodiments of this application, the equalization compensation is performed on the testing symbol pattern in the optical signal transmitted by the optical transmitter using the NRZ-PAM2 scheme, and the value of the first parameter used to determine the transmitter dispersion eye pattern closure degree of the optical transmitter is calculated based on the testing eye pattern and the noise enhancement coefficient that corresponds to the equalization compensation, where the testing eye pattern is obtained through composition using the testing symbol pattern on which the equalization compensation has been performed. As such, it can be determined, based on the value of the first parameter, whether the optical signal transmitted by the optical transmitter using the NRZ-PAM2 scheme can meet the use requirement of the optical receiver when the optical receiver uses the equalization receiving manner.

BRIEF DESCRIPTION OF DRAWINGS

FIG. 4 is a schematic flowchart of another conformance testing method according to an embodiment of this application;

DESCRIPTION OF EMBODIMENTS

A physical layer device in a data communications network includes components such as an optical transmitter, a channel (a cable or a fiber), and an optical receiver. Currently, before delivering an optical transmitter, a manufacturer of the optical transmitter performs conformance testing on the optical transmitter. It can be accurately determined, through conformance testing, whether the optical transmitter can be compatible with a channel and/or an optical receiver provided by another manufacturer.

Currently, for an optical transmitter that modulates an optical signal using an NRZ-PAM2 scheme, conformance testing is performed on such type of optical transmitters using a TDEC testing parameter and a conformance testing method thereof. With a constant increase of a transmission rate, impact of ISI on quality of a transmitted data signal is increasingly severe. Therefore, equalization receiving technologies such as FFE, DFE, and MLSE are gradually introduced into a direct modulation and direct detection-based optical link. To be more specific, when receiving an optical signal transmitted by an optical transmitter using the NRZ-PAM2 scheme, an optical receiver performs equalization processing on the optical signal.

However, because a change of optical signal quality caused by equalization receiving of an optical receiver is not considered in an existing conformance testing solution, when an optical receiver uses an equalization receiving manner, how to determine whether an optical signal transmitted by an optical transmitter using the NRZ-PAM2 scheme can meet a use requirement of the optical receiver is a problem urgently needing to be resolved.

Considering the foregoing problem, the embodiments of this application provide a conformance testing method, to test an optical signal transmitted by an optical transmitter using an NRZ-PAM2 scheme, to determine whether the optical signal can meet a use requirement of an optical receiver.

Figure 1:
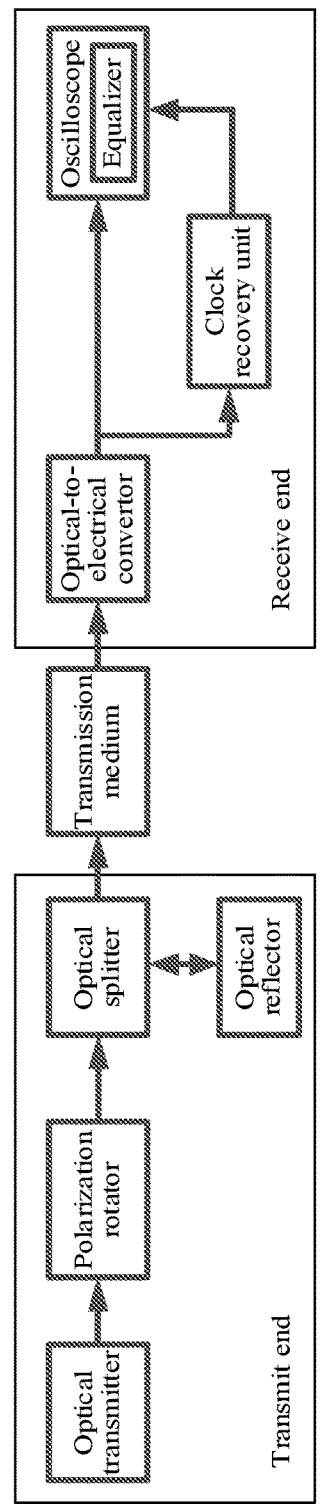
FIG. 1 is a schematic diagram of a testing system according to an embodiment of this application.

For ease of understanding the embodiments of this application, a testing system used in the embodiments of this application is described and introduced below. FIG. 1 is a schematic diagram of a testing system according to an embodiment of this application. As shown in FIG. 1, the testing system may include a polarization rotator, an optical splitter, and an optical reflector (e.g., variable reflector) that are located on a transmit end, an optical-to-electrical (O/E) convertor, a clock recovery unit (CRU), an oscilloscope, and an equalizer that are located on a receive end, and a transmission medium connecting the transmit end and the receive end. The transmission medium herein may be, for example, a fiber, or a dispersion medium having a dispersion value equivalent to that of the fiber.

The polarization rotator is configured to adjust a polarization direction of an optical signal passing through the polarization rotator, to change relative intensity noise of a to-be-tested optical transmitter (namely, an optical transmitter using an NRZ-PAM2 scheme, briefly referred to as the optical transmitter below). Therefore, conformance between optical signals sent by the to-be-tested optical transmitter under different relative intensity noise can be tested using the testing system. In this embodiment of this application, the polarization rotator may be disposed between the optical transmitter and the optical splitter, or may be disposed between the optical splitter and the optical reflector. This is not limited. FIG. 1 shows the testing system in which the polarization rotator is disposed between the optical transmitter and the optical splitter.

The optical reflector is connected to an optical link using the optical splitter, and is configured to reflect an optical signal in the optical link, to simulate a reflection phenomenon, in a real transmission process, of an optical signal transmitted by the optical transmitter. In this embodiment of this application, a bandwidth of the optical reflector is equivalent to a bandwidth of the optical-to-electrical converter on the receive end.

The optical-to-electrical converter, the clock recovery unit, and the equalizer are configured to simulate behavior of an optical receiver (namely, an optical receiver that receives an optical signal in an equalization receiving manner). The optical-to-electrical converter is configured to convert the received optical signal into an electrical signal. The clock recovery unit is configured to extract a clock in the optical signal transmitted by the optical transmitter. The oscilloscope is configured to collect, in the form of a sequence, a symbol pattern in the electrical signal processed by the optical-to-electrical converter and the clock recovery unit. Optical parameters of the optical signal transmitted by the optical transmitter such as an optical modulation amplitude (OMA), an average optical power, and an extinction ratio can be figured out using the collected symbol pattern in the electrical signal. The equalizer is configured to perform equalization compensation on the collected symbol pattern. Optionally, the oscilloscope may be an oscilloscope triggered by a symbol pattern, or may be an oscilloscope performing real-time collection. The oscilloscope triggered by a symbol pattern means that the oscilloscope is triggered to start collection after the oscilloscope detects a signal of a preset symbol pattern. The oscilloscope performing real-time collection means that the oscilloscope is always in a signal collection state.

It should be noted that the optical-to-electrical converter, the clock recovery unit, and the equalizer may be independent of the oscilloscope, or may be integrated into the oscilloscope. In the testing system shown in FIG. 1, the optical-to-electrical converter and the clock recovery unit are independent of the oscilloscope and the equalizer is integrated into the oscilloscope.

In this embodiment of this application, when it is determined whether the optical signal transmitted by the optical transmitter using the NRZ-PAM2 scheme meets a use requirement of the optical receiver, first, the optical signal transmitted by the optical transmitter may be collected on the receive end using the testing system.

A tester starts the optical transmitter, and loads a testing sequence of a preset symbol pattern (briefly referred to as a testing sequence) in the optical transmitter. The testing sequence herein may be a sequence having a fixed length. The sequence has sufficient randomicity, to simulate data transmitted in a real transmission scenario. A spectrum component (or time domain randomicity) of the sequence may be similar to that of the data transmitted in the real transmission scenario. The optical transmitter modulates the testing sequence using the NRZ-PAM2 scheme to generate an optical signal, and sends the optical signal to an optical link. The tester may rotate the polarization rotator according to a testing requirement, to change a polarization direction of the optical signal. Then, the oscilloscope of the testing system may collect a testing symbol pattern in the optical signal on the receive end. Because the testing sequence has the fixed length, the oscilloscope can collect a complete symbol pattern (namely, the testing symbol pattern) of the testing sequence from the optical signal based on the length of the testing sequence.

Optionally, the oscilloscope may collect the testing symbol pattern in a non-average mode, or may collect the testing symbol pattern in an equivalent-time mode. An example in which the testing symbol pattern is obtained through five times of collection on the optical signal is used. When the testing symbol pattern is collected in the non-average mode, the oscilloscope may perform collection on the optical signal for five times using five groups of different sampling parameters. The sampling parameters herein, for example, may include a sampling start point and a sampling interval. When the testing symbol pattern is collected in the equivalent-time mode, the oscilloscope may need to perform collection on the optical signal only once using a same group of sampling parameters, and then repeat the collected symbol pattern for four times.

After the oscilloscope collects the testing symbol pattern in the optical signal, in this embodiment of this application, the testing symbol pattern may be processed and analyzed, to determine whether the optical signal transmitted by the optical transmitter using the NRZ-PAM2 scheme can meet the use requirement of the optical receiver. An execution body of the method in the embodiments of this application may be a processing device having a processing function, for example, a computer, a server, or the like independent of the testing system, or the oscilloscope in the testing system. When the execution body of the embodiments of this application is the processing device independent of the testing system, the equalizer may exist in the testing system independently, or may be integrated into the oscilloscope in the testing system, or may be integrated into the processing device.

It should be noted that when the equalizer is integrated into the processing device (for example, the processing device independent of the testing system, or the oscilloscope in the testing system), the equalizer may be implemented using hardware and/or software. For example, the equalizer may be implemented by constructing an equalizer model in the processing device.

Embodiments are used below to describe in detail the technical solutions of this application. The following several embodiments may be combined with each other, and a same or similar concept or process may not be described repeatedly in some embodiments.

Figure 2:
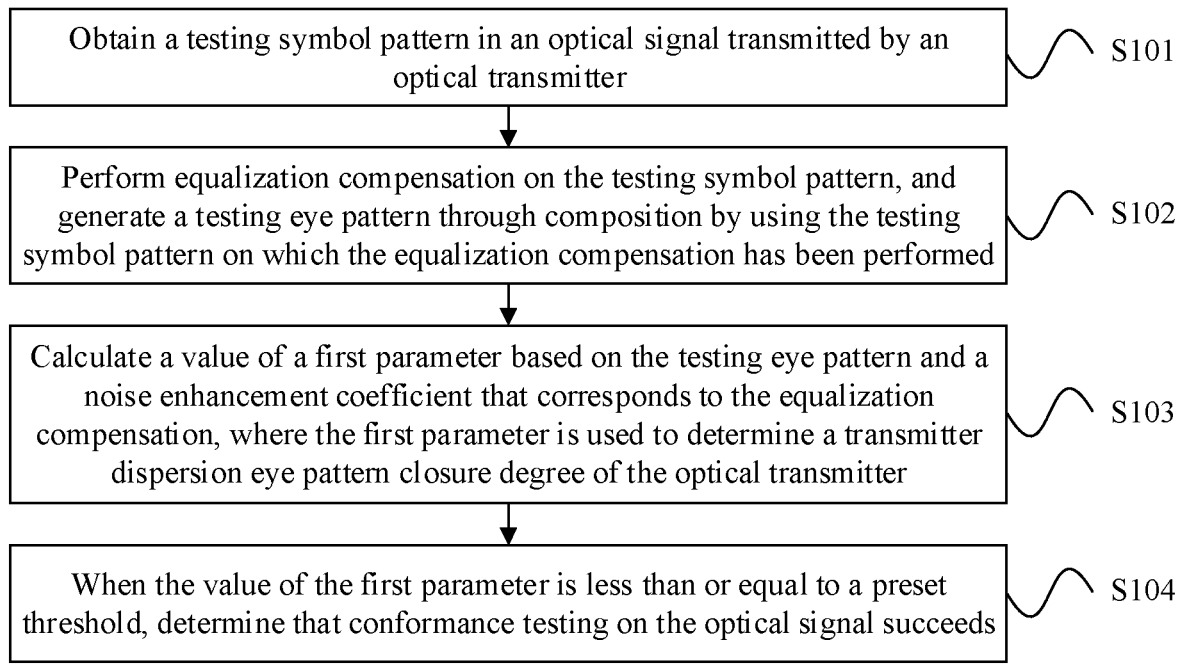
FIG. 2 is a schematic flowchart of a conformance testing method according to an embodiment of this application.

FIG. 2 is a schematic flowchart of a conformance testing method according to an embodiment of this application. As shown in FIG. 2, the method includes the following steps.

S101. Obtain a testing symbol pattern in an optical signal transmitted by an optical transmitter.

S102. Perform equalization compensation on the testing symbol pattern, and generate a testing eye pattern through composition using the testing symbol pattern on which the equalization compensation has been performed.

S103. Calculate a value of a first parameter based on the testing eye pattern and a noise enhancement coefficient that corresponds to the equalization compensation, where the first parameter is used to determine a transmitter dispersion eye pattern closure degree of the optical transmitter.

S104. When the value of the first parameter is less than or equal to a preset threshold, determine that conformance testing on the optical signal succeeds.

For example, after obtaining a testing symbol pattern collected by an oscilloscope, a processing device may perform equalization compensation on the testing symbol pattern using an equalizer, to simulate equalization receiving of an optical receiver in a real transmission process. During implementation, when performing the equalization compensation on the testing symbol pattern using the equalizer, the processing device may optimize tap coefficients of the equalizer to the best, such that for the testing symbol pattern on which the equalizer has performed the equalization compensation, a signal to noise ratio is optimal, a bit error rate is the lowest, and quality of an optical signal is optimal, to simulate the equalization receiving of the optical receiver in the real transmission scenario. In this manner, ISI can be compensated for, to ensure correctness of analyzing highest additive noise tolerable to the optical transmitter. In this case, a sum of the tap coefficients of the equalizer is equal to 1.

Figure 3:
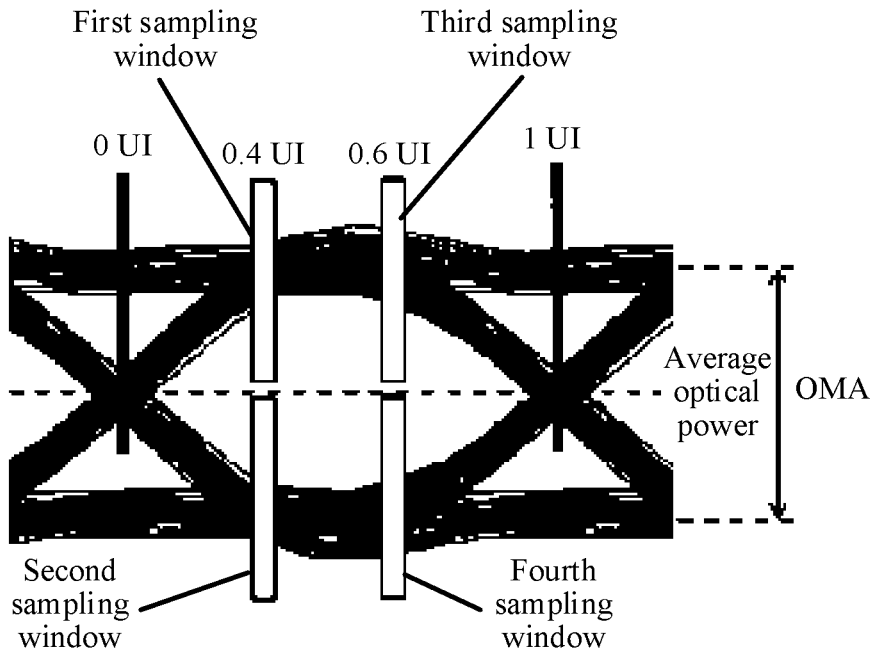
FIG. 3 is a schematic diagram of a testing eye pattern according to an embodiment of this application.

FIG. 3 is a schematic diagram of a testing eye pattern according to an embodiment of this application. After the equalizer performs the equalization compensation on the collected testing symbol pattern, the testing eye pattern obtained by the processing device through composition using the testing symbol pattern on which the equalization compensation has been performed may be shown in FIG. 3. It should be noted that because the testing system makes such simulation that the optical receiver receives the optical signal in an equalization receiving manner, when the oscilloscope collects the testing symbol pattern in an equivalent-time mode, when needing to obtain the testing eye pattern through composition, the processing device compensates for noise impact caused by the equalizer on the transmitter in the collection process, to ensure correctness of an amplitude of noise output by the equalizer.

When the equalizer performs the equalization compensation, noise of the optical signal also is enhanced. Because the enhanced noise affects quality of the optical signal, in this embodiment of this application, the processing device calculates the value of the first parameter (a parameter used to estimate whether the optical signal transmitted by the optical transmitter meets a use requirement of the optical receiver) based on the testing eye pattern obtained through composition and the noise enhancement coefficient $C_{eq}$ that corresponds to the equalization compensation, to accurately estimate the quality of the optical signal transmitted by the optical transmitter. The noise enhancement coefficient $C_{eq}$ herein may be determined based on normalized noise power spectrum density $N(f)$ (namely, normalized noise power spectrum density of an input end of the equalizer) that is of an input end and that corresponds to the equalization compensation and a normalized frequency response $H_{eq}(f)$ (namely, a normalized frequency response of the equalizer) corresponding to the equalization compensation.

For example, the noise enhancement coefficient $C_{eq}$ may be determined according to the following formula (0) or formula (1). The formula (0) and the formula (1) are as follows:

$$C_{eq} = \sqrt{\int_f N(f) \times H_{eq}(f) df} \qquad (0); \text{ and}$$

$$C_{eq} = \sqrt{\int_f N(f) \times |H_{eq}(f)|^2 df} \qquad (1),$$

where $f$ is a frequency, $N(f)$ is equivalent to white noise power spectrum density obtained after filtering of a four-order Bessel-Thomson response filter with 0.75× Baud rate, $\int_f N(f) df$ is equal to 1, and $H_{eq}(f)$ is equal to 1 when $f$ is equal to 0.

The following describes, with reference to the testing eye pattern shown in FIG. 3, a process of calculating, by the processing device, the value of the first parameter based on the testing eye pattern and the noise enhancement coefficient $C_{eq}$.

FIG. 4 is a schematic flowchart of another conformance testing method according to an embodiment of this application. As shown in FIG. 4, the method includes the following steps.

S201. Construct a histogram of a first sampling window, a histogram of a second sampling window, a histogram of a third sampling window, and a histogram of a fourth sampling window based on the testing eye pattern, where the first sampling window and the second sampling window are vertically symmetrically distributed on a left part of the testing eye pattern, and the third sampling window and the fourth sampling window are vertically symmetrically distributed on a right part of the testing eye pattern.

S202. Determine a first standard deviation based on the histogram of the first sampling window, the histogram of the second sampling window, the histogram of the third sampling window, the histogram of the fourth sampling window, and the noise enhancement coefficient, where the first standard deviation is a smaller value in a second standard deviation and a third standard deviation, the second standard deviation is a standard deviation of highest additive noise that can be supported by the optical transmitter when the first sampling window and the second sampling window reach a target bit error rate, and the third standard deviation is a standard deviation of highest additive noise that can be supported by the optical transmitter when the third sampling window and the fourth sampling window reach the target bit error rate.

S203. Determine, based on the first standard deviation, a standard deviation of highest additive noise that can be supported by the optical transmitter when the target bit error rate is reached.

S204. Determine the value of the first parameter based on the standard deviation of the highest additive noise that can be supported by the optical transmitter when the target bit error rate is reached.

After obtaining the testing eye pattern through composition using the testing symbol pattern on which the equalization compensation has been performed, the processing device may calculate an average optical power $P_{ave}$ (equivalent to an average optical power of the optical signal transmitted by the optical transmitter) of the testing eye pattern. Details may be shown in the following formula (2):

$$P_{ave} = \frac{P_u + P_l}{2}, \qquad (2)$$

where $P_u$ is an average optical power of an upper eyelid on the testing eye pattern, and $P_l$ is an average optical power of a lower eyelid on the testing eye pattern.

After calculating the average optical power $P_{ave}$ of the testing eye pattern, the processing device may determine, based on a value of the average optical power $P_{ave}$, a location of a schematic line of the average optical power $P_{ave}$ on the testing eye pattern. Then, the processing device may determine a location of 0 unit interval (UI) and a location of 1 UI on the testing eye pattern based on the location of the schematic line of the average optical power $P_{ave}$ on the testing eye pattern and locations of intersections on the testing eye pattern, to normalize the testing eye pattern in a direction of a time axis. The location of the 0 UI, the location of the 1 UI, and the location of the schematic line of the average optical power $P_{ave}$ on the testing eye pattern may be shown in FIG. 3. For a manner of normalizing, by the processing device, the testing eye pattern in the direction of the time axis, refer to other approaches. Details are not described herein again.

After normalizing the testing eye pattern in the direction of the time axis, the processing device may construct the histogram of the first sampling window, the histogram of the second sampling window, the histogram of the third sampling window, and the histogram of the fourth sampling window based on the location of the 0 UI, the location of the 1 UI, and the location of the schematic line of the average optical power $P_{ave}$ on the testing eye pattern. The first sampling window and the second sampling window are vertically symmetrically distributed on the left half part of the testing eye pattern, and the third sampling window and the fourth sampling window are vertically symmetrically distributed on the right half part of the testing eye pattern.

Locations of the sampling windows on the testing eye pattern are not limited in this embodiment. For example, sampling windows may be divided near a location at which an eye is opened to the greatest extent. A width of a sampling window may be determined according to a testing requirement. For example, the width of the sampling window may be 0.04 UI. A height of the sampling window may be determined based on the testing eye pattern, such that the sampling windows can cover all sampling points that are closest to the schematic line of the average optical power $P_{ave}$ and all sampling points that are farthest from the schematic line of the average optical power $P_{ave}$, to avoid omission of a sampling point. The sampling windows are divided in this manner, such that accuracy of histogram distribution functions subsequently obtained based on the histograms of the sampling windows can be ensured, to ensure accuracy of the second standard deviation and the third standard deviation that are calculated based on the histogram distribution functions. For details, refer to subsequent descriptions. Details are not described herein again.

For example, a boundary that is of a sampling window and that is close to the schematic line of the average optical power $P_{ave}$ may be enabled to approach the schematic line of the average optical power $P_{ave}$ as far as possible, and a boundary that is of the sampling window and that is far away from the schematic line of the average optical power $P_{ave}$ may be enabled to exceed a location at which an eye is opened to the greatest extent. In this way, when the boundary of the sampling window is further extended outwards, no extra sampling point enters the sampling window.

For example, FIG. 3 is a schematic diagram of constructing sampling windows at a location of 0.4 UI and a location of 0.6 UI. It is assumed that a width of each sampling window is 0.04 UI. To be more specific, the first sampling window and the second sampling window are located between 0.38 UI and 0.42 UI, and the third sampling window and the fourth sampling window are located between 0.58 UI and 0.62 UI. An example in which all sampling points included in the first sampling window and all sampling points included in the third sampling window are located on the upper eyelid on the testing eye pattern, and all sampling points included in the second sampling window and all sampling points included in the fourth sampling window are located on the lower eyelid on the testing eye pattern is used. Then, the first sampling window may include all sampling points that are between 0.38 UI and 0.42 UI and that are higher than the schematic line of the average optical power $P_{ave}$ on the testing eye pattern, the second sampling window may include all sampling points that are between 0.38 UI and 0.42 UI and that are lower than the schematic line of the average optical power $P_{ave}$ on the testing eye pattern, the third sampling window may include all sampling points that are between 0.58 UI and 0.62 UI and that are higher than the schematic line of the average optical power $P_{ave}$ on the testing eye pattern, and the fourth sampling window may include all sampling points that are between 0.58 UI and 0.62 UI and that are lower than the schematic line of the average optical power $P_{ave}$ on the testing eye pattern.

After dividing the first sampling window, the second sampling window, the third sampling window, and the fourth sampling window on the testing eye pattern, the processing device may construct the histogram of the first sampling window based on the sampling points in the first sampling window, construct the histogram of the second sampling window based on the sampling points in the second sampling window, construct the histogram of the third sampling window based on the sampling points in the third sampling window, and construct the histogram of the fourth sampling window based on the sampling points in the fourth sampling window. For how the processing device constructs a histogram of a sampling window based on sampling points in the sampling window, refer to descriptions in other approaches. Details are not described herein again.

After completing constructing the histogram of the first sampling window, the histogram of the second sampling window, the histogram of the third sampling window, and the histogram of the fourth sampling window, the processing device may determine the second standard deviation $\sigma_L$ based on the histogram of the first sampling window, the histogram of the second sampling window, and the noise enhancement coefficient $C_{eq}$, and determine the third standard deviation $\sigma_R$ based on the histogram of the third sampling window, the histogram of the fourth sampling window, and the noise enhancement coefficient $C_{eq}$. Further, the processing device may use the smaller value in the second standard deviation $\sigma_L$ and the third standard deviation $\sigma_R$ as the first standard deviation $\sigma_G$.

The following describes, using the first sampling window and the second sampling window shown in FIG. 3 as an example, how the processing device determines the second standard deviation $\sigma_L$. In other words, it is assumed that all the sampling points included in the first sampling window are located on the upper eyelid on the testing eye pattern and are higher than the schematic line of the average optical power $P_{ave}$ of the testing eye pattern, and all the sampling points included in the second sampling window are located on the lower eyelid on the testing eye pattern and are lower than the schematic line of the average optical power $P_{ave}$ of the testing eye pattern.

The processing device may determine a histogram distribution function $f_{ul}(y)$ of the first sampling window based on the histogram of the first sampling window, and determine a histogram distribution function $f_u(y)$ of the second sampling window based on the histogram of the second sampling window. A histogram distribution function is used to represent a probability distribution of sampling point distortion degrees in a sampling window.

Then, the processing device may determine the second standard deviation $\sigma_L$ based on the histogram distribution function $f_{ul}(y)$ of the first sampling window, the histogram distribution function $f_u(y)$ of the second sampling window, the target bit error rate $BER_{target}$, and a normal distribution curve function $Q(x)$. During implementation, the processing device may determine the second standard deviation $\sigma_L$ using a first formula. The first formula may be shown in the following formula (3):

$$\frac{1}{2}\left(\frac{\int f_{ul}(y)Q(x)dy}{\int f_{ul}(y)dy}\right) + \frac{1}{2}\left(\frac{\int f_u(y)Q(x)dy}{\int f_u(y)dy}\right) = BER_{target}, \quad (3)$$

where the normal distribution curve function $Q(x)$ may be a region whose value is greater than x in a normal distribution curve, and is used to represent a probability distribution of the highest additive noise that can be supported by the optical transmitter when the first sampling window and the second sampling window reach the target bit error rate, y is an independent variable of x, and when the second standard deviation $\sigma_L$ is determined, the normal distribution curve function $Q(x)$ may be determined based on the noise enhancement coefficient $C_{eq}$, the average optical power $P_{ave}$ of the testing eye pattern, and the second standard deviation $\sigma_L$.

Details are shown in the following formula (4):

$$Q(x) = \int_x^\infty \frac{(-z^2/2)}{\sqrt{2\pi}} dz, \quad (4)$$

where $$x = \frac{y - P_{ave}}{C_{eq} \cdot \sigma_L},$$

a value range of y is an interval between a largest value and a smallest value in optical power values corresponding to the sampling points in the first sampling window and the second sampling window, and z is an integral variable of the normal distribution curve function.

Because the histogram distribution function is used to represent the probability distribution of the sampling point distortion degrees in the sampling window, and Q(x) is used to represent the probability distribution of the highest additive noise that can be supported by the optical transmitter when the first sampling window and the second sampling window reach the target bit error rate, dividing a result of performing multiplication and integration on the two by an integral of the histogram distribution function may represent, in a normalized manner, a probability (namely, a bit error rate) that the optical receiver wrongly determines the optical signal when noise is $\sigma_L$. For example, a first term on a left side of an equation in the first formula is used to calculate a probability that an optical signal 1 is wrongly determined as 0, and a second term on the left side of the equation is used to calculate a probability that an optical signal 0 is wrongly determined as 1. A half of each of the two terms is obtained and the halves are added, to obtain the bit error rate corresponding to the testing eye pattern under the value of $\sigma_L$.

In this embodiment of this application, the target bit error rate is a threshold of forward error correction (FEC). To be more specific, the value of $\sigma_L$ corresponding to the target bit error rate $BER_{target}$ in the first formula is the standard deviation of the highest additive noise that can be supported by the optical transmitter when the first sampling window and the second sampling window reach the target bit error rate $BER_{target}$. To be more specific, when the value of $\sigma_L$ enables a bit error rate obtained by adding the two terms on the left side of the equation in the first formula to be greater than the target bit error rate $BER_{target}$, the optical receiver cannot correctly receive, through FEC, the optical signal transmitted by the optical transmitter. Therefore, the standard deviation of the highest additive noise that can be supported by the optical transmitter when the first sampling window and the second sampling window reach the target bit error rate $BER_{target}$ can be estimated using the first formula in a statistical analysis manner.

When the second standard deviation $\sigma_L$ is calculated using the first formula, because the processing device cannot obtain a value of the second standard deviation $\sigma_L$ by parsing the first formula, the processing device may determine, through numerical simulation, the second standard deviation $\sigma_L$ meeting the first formula.

Figure 5:
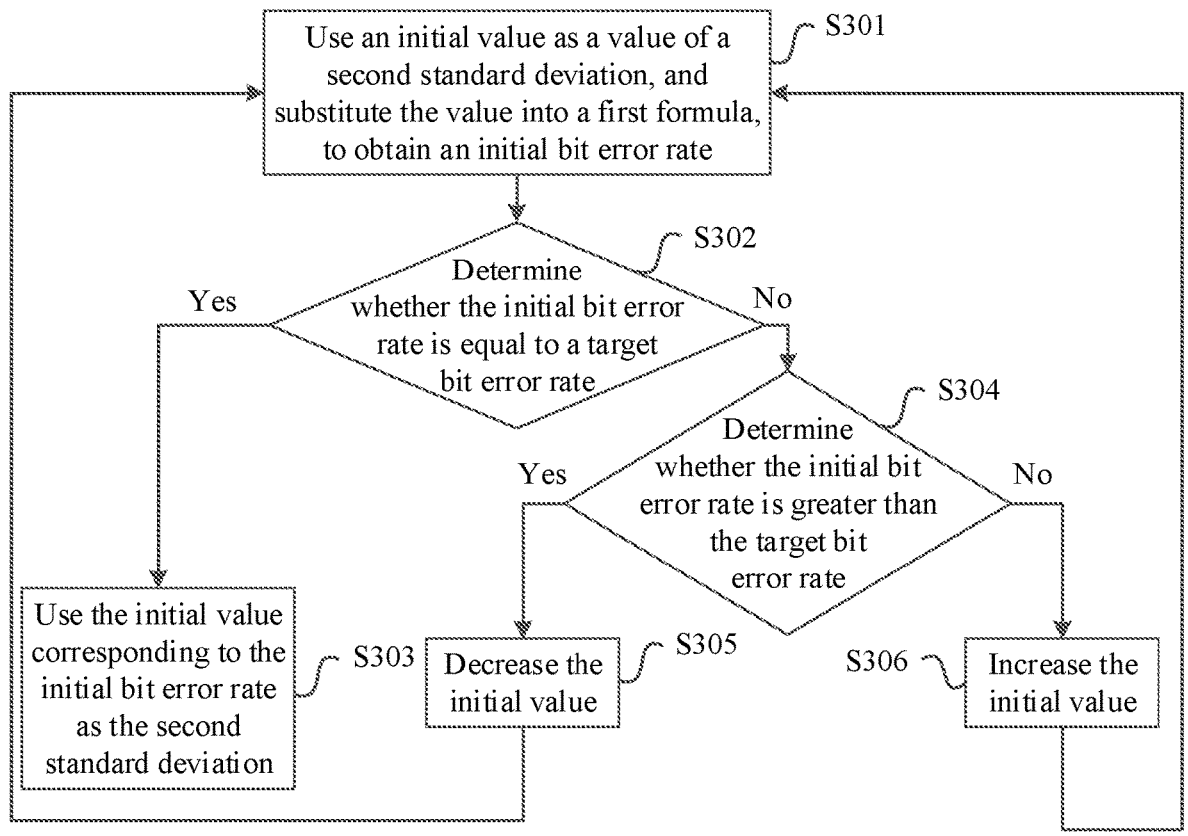
FIG. 5 is a schematic flowchart of still another conformance testing method according to an embodiment of this application.

FIG. 5 is a schematic flowchart of still another conformance testing method according to an embodiment of this application. As shown in FIG. 5, the method includes the following steps.

S301. Use an initial value as the value of the second standard deviation, and substitute the value into the first formula, to obtain an initial bit error rate.

S302. Determine whether the initial bit error rate is equal to the target bit error rate, and if the initial bit error rate is equal to the target bit error rate, perform step S303, or if the initial bit error rate is not equal to the target bit error rate, perform step S304.

S303. Use the initial value corresponding to the initial bit error rate as the second standard deviation.

S304. Determine whether the initial bit error rate is greater than the target bit error rate, and if the initial bit error rate is greater than the target bit error rate, perform S305, or if the initial bit error rate is not greater than the target bit error rate, perform S306.

S305. Decrease the initial value.

After S305 is performed, S301 is performed.

S306. Increase the initial value.

After S306 is performed, S301 is performed.

According to the method process shown in FIG. 5, the processing device may determine, through numerical simulation, the second standard deviation $\sigma_L$ meeting the first formula.

It may be understood that how the processing device determines the second standard deviation $\sigma_L$ is described and introduced using an example in which all the sampling points included in the first sampling window are located on the upper eyelid on the testing eye pattern and are higher than the schematic line of the average optical power $P_{ave}$ of the testing eye pattern, and all the sampling points included in the second sampling window are located on the lower eyelid on the testing eye pattern and are lower than the schematic line of the average optical power $P_{ave}$ of the testing eye pattern. A person skilled in the art may understand that the second standard deviation $\sigma_L$ may be determined still in the foregoing manner when all the sampling points included in the first sampling window are located on the lower eyelid on the testing eye pattern and are lower than the schematic line of the average optical power $P_{ave}$ of the testing eye pattern, and all the sampling points included in the second sampling window are located on the upper eyelid on the testing eye pattern and are higher than the schematic line of the average optical power $P_{ave}$ of the testing eye pattern. Details are not described herein again.

Correspondingly, the processing device may also determine the third standard deviation $\sigma_R$ still in the manner of determining the second standard deviation $\sigma_L$. It is assumed that all the sampling points included in the third sampling window are located on the upper eyelid on the testing eye pattern and are higher than the schematic line of the average optical power $P_{ave}$ of the testing eye pattern, and all the sampling points included in the fourth sampling window are located on the lower eyelid on the testing eye pattern and are lower than the schematic line of the average optical power $P_{ave}$ of the testing eye pattern. When the processing device determines the third standard deviation $\sigma_R$ using a first formula, the first formula may be shown in the following formula (5):

$$\frac{1}{2}\left(\frac{\int f_{ur}(y)Q(x)dy}{\int f_{ur}(y)dy}\right) + \frac{1}{2}\left(\frac{\int f_{lr}(y)Q(x)dy}{\int f_{lr}(y)dy}\right) = BER_{target}, \quad (5)$$

where $f_{ur}(y)$ is a histogram distribution function of the third sampling window, $f_{lr}(y)$ is a histogram distribution function of the fourth sampling window, the normal distribution curve function Q(x) may be a region whose value is greater than x in the normal distribution curve, and is used to represent a probability distribution of the highest additive noise that can be supported by the optical transmitter when the third sampling window and the fourth sampling window reach the target bit error rate, and y is an independent variable of x. When the third standard deviation $\sigma_R$ is determined, the normal distribution curve function Q(x) may be determined based on the noise enhancement coefficient $C_{eq}$, the average optical power $P_{ave}$ of the testing eye pattern, and the third standard deviation $\sigma_R$. Details are shown in the following formula (6):

$$Q(x) = \int_x^\infty \frac{(-z^2/2)}{\sqrt{2\pi}} dz, \qquad (6)$$

where $$x = \frac{y - P_{ave}}{C_{eq} \cdot \sigma_R},$$

a value range of y is an interval between a largest value and a smallest value in optical power values corresponding to the sampling points in the third sampling window and the fourth sampling window, and z is an integral variable of the normal distribution curve function.

For meanings represented by the foregoing formulas (5) and (6), refer to the descriptions of the formulas (3) and (4) of calculating the second standard deviation. Details are not described herein again. In addition, for how the processing device determines, through numerical simulation, the third standard deviation $\sigma_R$ meeting the first formula, refer to the descriptions of determining, by the processing device through numerical simulation, the second standard deviation $\sigma_L$ meeting the first formula. Details are not described herein again.

It may be understood that how the processing device determines the third standard deviation $\sigma_R$ is described and introduced using an example in which all the sampling points included in the third sampling window are located on the upper eyelid on the testing eye pattern and are higher than the schematic line of the average optical power $P_{ave}$ of the testing eye pattern, and all the sampling points included in the fourth sampling window are located on the lower eyelid on the testing eye pattern and are lower than the schematic line of the average optical power $P_{ave}$ of the testing eye pattern. A person skilled in the art may understand that the third standard deviation $\sigma_R$ may be determined still in the foregoing manner when all the sampling points included in the third sampling window are located on the lower eyelid on the testing eye pattern and are lower than the schematic line of the average optical power $P_{ave}$ of the testing eye pattern, and all the sampling points included in the fourth sampling window are located on the upper eyelid on the testing eye pattern and are higher than the schematic line of the average optical power $P_{ave}$ of the testing eye pattern. Details are not described herein again.

After determining the second standard deviation $\sigma_L$ and the third standard deviation $\sigma_R$ in the foregoing manner, the processing device may use the smaller value in the second standard deviation $\sigma_L$ and the third standard deviation $\sigma_R$ as the first standard deviation $\sigma_G$. It should be noted that when the testing eye pattern is horizontally symmetrical, the second standard deviation $\sigma_L$ and the third standard deviation $\sigma_R$ should be equal. However, because the testing eye pattern may be not horizontally symmetrical due to a performance factor and the like of the optical transmitter, a side that is of the testing eye pattern and that has a smaller standard deviation can be obtained in the manner of calculating the second standard deviation $\sigma_L$ and the third standard deviation $\sigma_R$. Because a smaller standard deviation indicates worse highest additive noise that can be supported by the optical transmitter when the target bit error rate is reached, subsequent calculation and processing are performed using a smaller standard deviation in standard deviations of two sides, such that it can be accurately determined whether the optical signal transmitted by the optical transmitter meets the use requirement of the optical receiver.

Base noise of an oscilloscope, an optical-to-electrical converter, and the like located on the receive end is not considered when the standard deviation of the highest additive noise that can be supported by the optical transmitter when the target bit error rate is reached is calculated. However, data needed for constructing a testing eye pattern or extracting a histogram distribution function of a sampling window includes the base noise of the receive end. Because the base noise of the receive end does not exist in a real transmission scenario, the base noise of the receive end leads to the smaller calculated standard deviation of the highest additive noise that can be supported by the optical transmitter when the target bit error rate is reached. Therefore, the processing device may add the base noise of the receive end after obtaining the first standard deviation $\sigma_G$, to ensure accuracy of the obtained standard deviation R of the highest additive noise that can be supported by the optical transmitter when the target bit error rate is reached.

During implementation, the processing device may determine, based on the first standard deviation $\sigma_G$ and a fourth standard deviation $\sigma_S$, the standard deviation R of the highest additive noise that can be supported by the optical transmitter when the target bit error rate is reached. Details are shown in the following formula (7):

$$R = \sqrt{\sigma_G^2 + \sigma_S^2} \qquad (7).$$

The fourth standard deviation $\sigma_S$ herein is a variance of base noise sums of the optical receiver side. Corresponding to the testing system shown in FIG. 1, base noise of the optical receiver side includes the base noise of the optical-to-electrical converter and the base noise of the oscilloscope on the receive end. Therefore, when the testing symbol pattern is collected using the testing system shown in FIG. 1, the fourth standard deviation $\sigma_S$ is a standard deviation of a base noise sum of the optical-to-electrical converter and a base noise sum of the oscilloscope on the receive end.

After determining the standard deviation R of the highest additive noise that can be supported by the optical transmitter when the target bit error rate is reached, the processing device may determine the value of the first parameter T based on the standard deviation R of the highest additive noise that can be supported by the optical transmitter when the target bit error rate is reached. Details are shown in the following formula (8):

$$T = 10 \log_{10}\left(\frac{OMA}{2Q} \times \frac{1}{R}\right) + M, \qquad (8)$$

where OMA is an optical modulation amplitude of the testing eye pattern, Q is a preset Q factor, and M is a first compensation factor.

The preset Q factor is a Q factor of a preset eye pattern under the target bit error rate, and the preset eye pattern herein is an eye pattern free of inter-symbol interference and noise. The optical modulation amplitude OMA of the testing eye pattern may be shown in the following formula (9):

$$OMA = P_u - P_l \quad (9),$$

where $P_u$ is the average optical power of the upper eyelid on the testing eye pattern, and $P_l$ is the average optical power of the lower eyelid on the testing eye pattern.

It should be noted that corresponding to the foregoing formula (7), when a photoelectric detector used by an optical receiver in a real link is a positive-intrinsic-negative (PIN) photodiode (also referred to as a PIN optical receiver), a value of M may be 0. When the photoelectric detector used by the optical receiver in the real link is a photoelectric detector of another type (a non-PIN optical receiver), the first compensation factor M may be determined based on an extinction ratio of the testing eye pattern. To be more specific, M is an empirical function using the extinction ratio of the testing eye pattern as an independent variable. The empirical function may be determined by constructing an optical receiver model and performing simulation. The extinction ratio herein may be shown in the following formula (10):

$$ER = \frac{P_u}{P_l}. \quad (10)$$

Because a ratio of the OMA to the preset Q factor may represent a standard deviation of highest additive noise that can be supported by an ideal optical transmitter when the target bit error rate is reached, a ratio of the standard deviation of the highest additive noise that can be supported by the ideal optical transmitter when the target bit error rate is reached to a standard deviation of highest additive noise that can be supported by a to-be-tested optical transmitter when the target bit error rate is reached can be obtained by dividing the ratio of the OMA to the preset Q factor by the standard deviation R of the highest additive noise that can be supported by the to-be-tested optical transmitter when the target bit error rate is reached. It can be accurately determined, using the ratio, that the optical signal transmitted by the optical transmitter can meet the use requirement of the optical receiver. For example, when the value of the first parameter T is less than or equal to the preset threshold, it is determined that conformance testing on the optical signal transmitted by the optical transmitter succeeds. In other words, the optical signal transmitted by the optical transmitter can meet the use requirement of the optical receiver. When the value of the first parameter T is greater than the preset threshold, it is determined that conformance testing on the optical signal transmitted by the optical transmitter fails. In other words, the optical signal transmitted by the optical transmitter cannot meet the use requirement of the optical receiver.

As described in the foregoing embodiments, the optical receiver in the real link includes a PIN optical receiver and a non-PIN optical receiver. For the non-PIN optical receiver, total noise of the non-PIN optical receiver does not mainly include thermal noise of a transimpedance amplifier (TIA). In this scenario, when the optical transmitter transmits an optical signal to the non-PIN optical receiver, in an eye pattern obtained through composition based on the optical signal that is received by the non-PIN optical receiver in the equalization receiving manner, a standard deviation of highest additive noise that can be supported by the optical transmitter when an upper eyelid on the eye pattern reaches the target bit error rate and a standard deviation of highest additive noise that can be supported by the optical transmitter when a lower eyelid on the eye pattern reaches the target bit error rate are no longer equal, and change with an extinction ratio of the eye pattern. Therefore, when calculating the value of the first parameter T, the processing device further needs to consider an impact caused by a second compensation factor $M_1$ that is determined based on the extinction ratio of the testing eye pattern.

During implementation, a relationship between the second compensation factor $M_1$ and the extinction ratio may be represented using a check list between an extinction ratio and a compensation factor or a function relationship between an extinction ratio and a compensation factor. The check list or the function relationship may be determined by constructing a model of a preset optical receiver (which may be alternatively referred to as a standard optical receiver). The following two manners may be included.

In a first manner, after constructing the model of the preset optical receiver, the processing device may obtain a fifth standard deviation and a sixth standard deviation of the preset optical receiver under each extinction ratio. The fifth standard deviation is a standard deviation of highest additive noise that can be supported when an upper eyelid on an eye pattern corresponding to an optical signal received by the preset optical receiver under each extinction ratio reaches the target bit error rate, and the sixth standard deviation is a standard deviation of highest additive noise that can be supported when a lower eyelid on the eye pattern corresponding to the optical signal received by the preset optical receiver under each extinction ratio reaches the target bit error rate.

Then, the processing device may divide the fifth standard deviation by the sixth standard deviation under each extinction ratio to obtain a compensation factor corresponding to each extinction ratio, and may further establish a check list between an extinction ratio and a compensation factor or a function relationship between an extinction ratio and a compensation factor based on the compensation factor corresponding to each extinction ratio.

Optionally, the obtained fifth standard deviation and sixth standard deviation of the preset optical receiver under each extinction ratio may be the fifth standard deviation and the sixth standard deviation of the preset optical receiver in a preset decision level and under each extinction ratio. The preset decision level, for example, may be equal to $$\frac{R_{responsivity}(P_0 + P_1)}{2} \text{ or } \frac{R_{responsivity}(\sigma_1 P_0 + \sigma_0 P_1)}{(\sigma_1 + \sigma_0)}.$$

$R_{responsivity}$ is responsivity of the preset optical receiver, $P_0$ is an average optical power of the upper eyelid on the eye pattern corresponding to the optical signal received by the preset optical receiver under each extinction ratio, $P_1$ is an average optical power of the lower eyelid on the eye pattern corresponding to the optical signal received by the preset optical receiver under each extinction ratio, $\sigma_1$ is the fifth standard deviation, and $\sigma_0$ is the sixth standard deviation.

It may be understood that the preset optical receiver may be determined based on parameters of the optical receiver such as a preset bandwidth, responsivity, thermal noise, shot noise, and spontaneous emission beat noise. Values of the parameters may be determined using typical values in simulation, manufacturing, and testing processes of a manufacturer of the optical receiver.

In a second manner, after constructing the model of the preset optical receiver, the processing device may obtain a fifth standard deviation and a sixth standard deviation corresponding to each sensitivity value of the preset optical receiver under each extinction ratio. The sensitivity value herein is a sensitivity value of the preset optical receiver under each extinction ratio when the target bit error rate is reached.

Then, the processing device may divide the fifth standard deviation corresponding to each sensitivity value under each extinction ratio by the sixth standard deviation to obtain a compensation factor corresponding to each sensitivity value under each extinction ratio, and establish a check list among an extinction ratio, sensitivity, and a compensation factor or a function relationship among an extinction ratio, sensitivity, and a compensation factor based on the compensation factor corresponding to each sensitivity value under each extinction ratio.

Optionally, the obtained fifth standard deviation and sixth standard deviation corresponding to each sensitivity value of the preset optical receiver under each extinction ratio may be the fifth standard deviation and the sixth standard deviation corresponding to each sensitivity value of the preset optical receiver in a preset decision level and under each extinction ratio. For descriptions of the preset decision level and the preset optical receiver, refer to the foregoing descriptions. Details are not described herein again.

It should be noted that when the optical receiver in the real link is the non-PIN optical receiver, the value of the second compensation factor $M_1$ may be determined based on the extinction ratio of the testing eye pattern or the check list that is between an extinction ratio and a compensation factor and that is determined in either of the foregoing manners or the function relationship that is between an extinction ratio and a compensation factor and that is determined in either of the foregoing manners. It may be understood that when the value of the second compensation factor $M_1$ is determined in the second manner, sensitivity of the optical receiver further needs to be considered. Details are not described herein. When the optical receiver in the real link is the PIN optical receiver, the value of the second compensation factor $M_1$ may be 1, and does not need to be determined based on the extinction ratio of the testing eye pattern.

The following describes how the processing device calculates the value of the first parameter based on the histogram of the first sampling window, the histogram of the second sampling window, the histogram of the third sampling window, the histogram of the fourth sampling window, the noise enhancement coefficient $C_{eq}$, and the second compensation factor $M_1$ that is determined based on the extinction ratio of the testing eye pattern.

First, how the processing device determines the second standard deviation $\sigma_L$ is described still using the first sampling window and the second sampling window shown in FIG. 3 as an example. In other words, it is assumed that all the sampling points included in the first sampling window are located on the upper eyelid on the testing eye pattern and are higher than the schematic line of the average optical power $P_{ave}$ of the testing eye pattern, and all the sampling points included in the second sampling window are located on the lower eyelid on the testing eye pattern and are lower than the schematic line of the average optical power $P_{ave}$ of the testing eye pattern.

The processing device may determine a histogram distribution function $f_{ul}(y)$ of the first sampling window based on the histogram of the first sampling window, and determine a histogram distribution function $f_u(y)$ of the second sampling window based on the histogram of the second sampling window. The histogram distribution function is used to represent a probability distribution of sampling point distortion degrees in a sampling window.

Then, the processing device may determine the second standard deviation $\sigma_L$ based on the histogram distribution function $f_{ul}(y)$ of the first sampling window, the histogram distribution function $f_u(y)$ of the second sampling window, the target bit error rate $BER_{target}$, a normal distribution curve function $Q(x_{ul})$ of the first sampling window, and a normal distribution curve function $Q(x_u)$ of the second sampling window. During implementation, the processing device may determine the second standard deviation $\sigma_L$ using a second formula. The second formula may be shown in the following formula (11):

$$\frac{1}{2}\left(\frac{\int f_{ul}(y)Q(x_{ul})dy}{\int f_{ul}(y)dy}\right) + \frac{1}{2}\left(\frac{\int f_{ll}(y)Q(x_{ll})dy}{\int f_{ll}(y)dy}\right) = BER_{target}. \quad (11)$$

The normal distribution curve function $Q(x_{ul})$ of the first sampling window may be a region whose value is greater than $x_{ul}$ in a normal distribution curve, and is used to represent a probability distribution of the highest additive noise that can be supported by the optical transmitter when the first sampling window reaches the target bit error rate. The normal distribution curve function $Q(x_u)$ of the second sampling window may be a region whose value is greater than $x_u$ in a normal distribution curve, and is used to represent a probability distribution of the highest additive noise that can be supported by the optical transmitter when the second sampling window reaches the target bit error rate. $y$ is an independent variable of $x_{ul}$ and $x_u$.

When the second standard deviation $\sigma_L$ is determined, the normal distribution curve function $Q(x_{ul})$ of the first sampling window may be determined based on the noise enhancement coefficient $C_{eq}$, a preset optical power threshold $P_{th}$, the second standard deviation $\sigma_L$, and the second compensation factor $M_1$. Details are shown in the following formula (12):

$$Q(x_{ul}) = \int_{x_{ul}}^{\infty} \frac{(-z^2/2)}{\sqrt{2\pi}} dz. \quad (12)$$

The normal distribution curve function $Q(x_{ll})$ of the second sampling window may be determined based on the noise enhancement coefficient $C_{eq}$, the preset optical power threshold $P_{th}$, and the second standard deviation $\sigma_L$. Details are shown in the following formula (13):

$$Q(x_{ll}) = \int_{x_{ll}}^{\infty} \frac{(-z^2/2)}{\sqrt{2\pi}} dz, \quad (13)$$

where $$x_{ul} = \frac{y - P_{th}}{C_{eq} \cdot M_1 \cdot \sigma_L}, x_{ll} = \frac{P_{th} - y}{C_{eq} \cdot \sigma_L},$$

a value range of y is an interval between a largest value and a smallest value in optical power values corresponding to the sampling points in the first sampling window and the second sampling window, and z is an integral variable of the normal distribution curve function.

A value of the preset optical power threshold $P_{th}$ may be determined based on a threshold of determining, by the optical receiver, an optical signal in a real application scenario. For example, $P_{th} = P_{ave} \pm a$ or $$P_{th} = \frac{\sigma_{ideal} P_1 + M_2 \cdot \sigma_{ideal} P_0}{(M_2 + 1) \cdot \sigma_{ideal}} \pm b.$$

$\sigma_{ideal}$ is a first standard deviation corresponding to a preset optical transmitter. The preset optical transmitter is an optical transmitter transmitting an optical signal that is free of noise, jittering, and inter-symbol interference. An eye pattern obtained based on the optical signal transmitted by the preset optical transmitter is referred to as a preset eye pattern. $P_1$ is an average optical power of an upper eyelid on the preset eye pattern, $P_0$ is an average optical power of a lower eyelid on the preset eye pattern, $M_2$ is a third compensation factor, and the third compensation factor is determined based on an extinction ratio of the preset eye pattern, and the check list that is between an extinction ratio and a compensation factor and that is determined in either of the foregoing manners or the function relationship that is between an extinction ratio and a compensation factor and that is determined in either of the foregoing manners. Both a and b are greater than or equal to 0, and may be set according to a testing requirement.

Because a histogram distribution function of a sampling window is used to represent a probability distribution of sampling point distortion degrees in the sampling window, and a normal distribution curve function of a sampling window is used to represent a probability distribution of the highest additive noise that can be supported by the optical transmitter when the sampling window reaches the target bit error rate, dividing a result of performing multiplication and integration on the two by an integral of the histogram distribution function may represent, in a normalized manner, a probability (namely, a bit error rate) that the optical receiver wrongly determines an optical signal when noise is $\sigma_L$. For example, a first term on a left side of an equation in the second formula is used to calculate a probability that an optical signal 1 is wrongly determined as 0, and a second term on the left side of the equation is used to calculate a probability that an optical signal 0 is wrongly determined as 1. A half of each of the two terms is obtained and the halves are added, to obtain the bit error rate corresponding to the testing eye pattern under the value of $\sigma_L$.

In this embodiment of this application, the target bit error rate is a threshold of forward error correction (FEC). To be more specific, the value of $\sigma_L$ corresponding to the target bit error rate $BER_{target}$ in the second formula is the standard deviation of the highest additive noise that can be supported by the optical transmitter when the first sampling window and the second sampling window reach the target bit error rate $BER_{target}$. To be more specific, when the value of $\sigma_L$ enables a bit error rate obtained by adding the two terms on the left side of the equation in the second formula to be greater than the target bit error rate $BER_{target}$, the optical receiver cannot correctly receive, through FEC, the optical signal transmitted by the optical transmitter. Therefore, the standard deviation of the highest additive noise that can be supported by the optical transmitter when the first sampling window and the second sampling window reach the target bit error rate $BER_{target}$ can be estimated using the second formula in a statistical analysis manner.

When the second standard deviation $\sigma_L$ is calculated using the foregoing second formula, because the processing device cannot obtain the value of the second standard deviation $\sigma_L$ by parsing the second formula, the processing device may determine, through numerical simulation, the second standard deviation $\sigma_L$ meeting the second formula. For how the processing device determines, through numerical simulation, the second standard deviation $\sigma_L$ meeting the second formula, refer to the descriptions of determining, by the processing device through numerical simulation, the second standard deviation $\sigma_L$ meeting the first formula. Details are not described herein again.

Correspondingly, the processing device may also determine the third standard deviation $\sigma_R$ in the manner of determining the second standard deviation $\sigma_L$. It is assumed that all the sampling points included in the third sampling window are located on the upper eyelid on the testing eye pattern and are higher than the schematic line of the average optical power $P_{ave}$ of the testing eye pattern, and all the sampling points included in the fourth sampling window are located on the lower eyelid on the testing eye pattern and are lower than the schematic line of the average optical power $P_{ave}$ of the testing eye pattern. When the processing device determines the third standard deviation $\sigma_R$ using the second formula, the second formula may be shown in the following formula (14):

$$\frac{1}{2}\left(\frac{\int f_{ur}(y)Q(x_{ur})dy}{\int f_{ur}(y)dy}\right) + \frac{1}{2}\left(\frac{\int f_{lr}(y)Q(x_{lr})dy}{\int f_{lr}(y)dy}\right) = BER_{target}, \quad (14)$$

where $f_{ur}(y)$ is the histogram distribution function of the third sampling window, $f_{lr}(y)$ is the histogram distribution function of the fourth sampling window, $Q(x_{ur})$ is the normal distribution curve function of the third sampling window, $Q(x_{ur})$ may be a region whose value is greater than $x_{ur}$ in the normal distribution curve, and is used to represent a probability distribution of the highest additive noise that can be supported by the optical transmitter when the third sampling window reaches the target bit error rate, $Q(x_{lr})$ is the normal distribution curve function of the fourth sampling window, $Q(x_{lr})$ may be a region whose value is greater than $x_{lr}$ in the normal distribution curve, and is used to represent a probability distribution of the highest additive noise that can be supported by the optical transmitter when the fourth sampling window reaches the target bit error rate, and y is an independent variable of $x_{ur}$ and $x_{lr}$.

When the third standard deviation $\sigma_R$ is determined, the normal distribution curve function $Q(x_{ur})$ of the third sampling window may be determined based on the noise enhancement coefficient $C_{eq}$, the preset optical power threshold $P_{th}$, the third standard deviation $\sigma_R$, and the second compensation factor $M_1$. Details are shown in the following formula (15):

$$Q(x_{ur}) = \int_{x_{ur}}^{\infty} \frac{(-z^2/2)}{\sqrt{2\pi}} dz. \quad (15)$$

The normal distribution curve function $Q(x_{lr})$ of the fourth sampling window may be determined based on the noise enhancement coefficient $C_{eq}$, the preset optical power threshold $P_{th}$, and the third standard deviation $\sigma_R$. Details are shown in the following formula (16):

$$Q(x_{lr}) = \int_{x_{lr}}^{\infty} \frac{(-z^2/2)}{\sqrt{2\pi}} dz, \quad (16)$$

where $$x_{ur} = \frac{y - P_{th}}{C_{eq} \cdot M_1 \cdot \sigma_R}, \quad x_{lr} = \frac{P_{th} - y}{C_{eq} \cdot \sigma_R},$$

a value range of y is an interval between a largest value and a smallest value in optical power values corresponding to the sampling points in the third sampling window and the fourth sampling window, $M_1$ is determined based on the extinction ratio of the testing eye pattern, and z is an integral variable of the normal distribution curve function.

For meanings represented by the foregoing formulas (15) and (16), refer to the descriptions of the formulas (12) and (13) of calculating the second standard deviation. Details are not described herein again. In addition, for how the processing device determines, through numerical simulation, the third standard deviation $\sigma_R$ meeting the second formula, refer to the descriptions of determining, by the processing device through numerical simulation, the second standard deviation $\sigma_L$ meeting the first formula. Details are not described herein again.

After determining the second standard deviation $\sigma_L$ and the third standard deviation $\sigma_R$ in the foregoing manner, the processing device may use the smaller value in the second standard deviation $\sigma_L$ and the third standard deviation $\sigma_R$ as the first standard deviation $\sigma_G$. For technical effects of using the smaller value in the second standard deviation $\sigma_L$ and the third standard deviation $\sigma_R$ as the first standard deviation $\sigma_G$, refer to the descriptions of "using the smaller value in the second standard deviation $\sigma_L$ and the third standard deviation $\sigma_R$ as the first standard deviation $\sigma_G$".

Correspondingly, the processing device may add base noise of the receive end after obtaining the first standard deviation $\sigma_G$, to ensure accuracy of the obtained standard deviation R of the highest additive noise that can be supported by the optical transmitter when the target bit error rate is reached.

During implementation, the processing device may determine, based on the first standard deviation $\sigma_G$, the second compensation factor $M_1$, and a fourth standard deviation $\sigma_S$, the standard deviation R of the highest additive noise that can be supported by the optical transmitter when the target bit error rate is reached. Details are shown in the following formula (17):

$$R = \sqrt{[(1+M_1)\sigma_G]^2 + \sigma_S^2} \quad (17)$$

The fourth standard deviation $\sigma_S$ herein is a variance of base noise sums of the optical receiver side. Corresponding to the testing system shown in FIG. 1, the base noise of the optical receiver side includes base noise of an optical-to-electrical converter and base noise of an oscilloscope on the receive end. Therefore, when the testing symbol pattern is collected using the testing system shown in FIG. 1, the fourth standard deviation $\sigma_S$ is a standard deviation of a base noise sum of the optical-to-electrical converter and a base noise sum of the oscilloscope on the receive end.

After determining the standard deviation R of the highest additive noise that can be supported by the optical transmitter when the target bit error rate is reached, the processing device may determine the value of the first parameter T based on the standard deviation R of the highest additive noise that can be supported by the optical transmitter when the target bit error rate is reached. Details are shown in the following formula (18):

$$T = 10\log_{10}\left(\frac{R_{preset}}{R}\right), \quad (18)$$

where $R_{preset}$ is a standard deviation of highest additive noise that can be supported by the preset optical transmitter when the target bit error rate is reached, and $R_{preset}$ may be obtained in the following manner.

The processing device may obtain the preset eye pattern obtained based on the optical signal transmitted by the preset optical transmitter, and may further determine, based on a normal distribution curve function $Q(x_u)$ of the upper eyelid on the preset eye pattern, a normal distribution curve function $Q(x_l)$ of the lower eyelid on the preset eye pattern, and the target bit error rate $BER_{target}$, the standard deviation $R_{preset}$ of the highest additive noise that can be supported by the preset optical transmitter when the target bit error rate is reached.

During implementation, the processing device may determine, using a third formula, a first standard deviation $\sigma_{ideal}$ corresponding to the preset optical transmitter. The third formula may be shown in the following formula (19):

$$\frac{1}{2}[Q(x_u) + Q(x_l)] = BER_{target} \quad (19),$$

where $$Q(x_u) = \int_{x_u}^{\infty} \frac{(-z^2/2)}{\sqrt{2\pi}} dz, \quad x_u = \frac{P_{u_{ideal}} - P_{th}}{M_2 \cdot \sigma_{ideal}},$$

$$Q(x_l) = \int_{x_l}^{\infty} \frac{(-z^2/2)}{\sqrt{2\pi}} dz, \quad x_l = \frac{P_{th} - P_{l_{ideal}}}{\sigma_{ideal}},$$

$P_{u_{ideal}}$ is an average optical power value of the upper eyelid on the preset eye pattern, $P_{l_{ideal}}$ is an average optical power value of the lower eyelid on the preset eye pattern, $M_2$ is the third compensation factor, and the third compensation factor may be determined based on the extinction ratio of the preset eye pattern.

After the first standard deviation $\sigma_{ideal}$ corresponding to the preset optical transmitter is obtained, the standard deviation $R_{preset}$ of the highest additive noise that can be supported by the preset optical transmitter when the target bit error rate is reached may be determined based on $\sigma_{ideal}$. During implementation, the processing device may determine, based on the first standard deviation $\sigma_{ideal}$ corresponding to the preset optical transmitter and the third compensation factor $M_2$, the standard deviation $R_{preset}$ of the highest additive noise that can be supported by the preset optical transmitter when the target bit error rate is reached. Details are shown in the following formula (20):

$$R_{preset}=(1+M_2)\sigma_{ideal} \qquad (20).$$

Because $R_{preset}$ may represent a standard deviation of highest additive noise that can be supported by an ideal optical transmitter when the target bit error rate is reached, a ratio of the standard deviation of the highest additive noise that can be supported by the ideal optical transmitter when the target bit error rate is reached to a standard deviation of highest additive noise that can be supported by a to-be-tested optical transmitter when the target bit error rate is reached can be obtained by dividing $R_{preset}$ by the standard deviation R of the highest additive noise that can be supported by the to-be-tested optical transmitter when the target bit error rate is reached. It can be accurately determined, using the ratio, that the optical signal transmitted by the optical transmitter can meet the use requirement of the optical receiver. For example, when the value of the first parameter T is less than or equal to the preset threshold, it is determined that conformance testing on the optical signal transmitted by the optical transmitter succeeds. In other words, the optical signal transmitted by the optical transmitter can meet the use requirement of the optical receiver. When the value of the first parameter T is greater than the preset threshold, it is determined that conformance testing on the optical signal transmitted by the optical transmitter fails. In other words, the optical signal transmitted by the optical transmitter cannot meet the use requirement of the optical receiver.

It should be noted that when the testing symbol pattern in the optical signal transmitted by the optical transmitter is collected on the receive end using the testing system, if a tester adjusts relative intensity noise of the to-be-detected optical transmitter to the maximum by rotating a polarization rotator, such that the optical signal transmitted by the optical transmitter is transmitted when the relative intensity noise of the optical transmitter is highest, in this scenario, a conformance testing result that is of the optical signal and that is obtained by collecting the optical signal transmitted by the optical transmitter when the relative intensity noise is highest and performing the conformance testing method in any one of the foregoing method embodiments can represent a conformance testing result of the optical transmitter. In other words, when the value of the first parameter T is less than or equal to the preset threshold, it is determined that conformance testing on the optical transmitter succeeds. When the value of the first parameter T is greater than the preset threshold, it is determined that conformance testing on the optical transmitter fails.

According to the conformance testing method provided in the embodiments of this application, the equalization compensation is performed on the testing symbol pattern in the optical signal transmitted by the optical transmitter using the NRZ-PAM2 scheme, and the value of the first parameter used to determine the transmitter dispersion eye pattern closure degree of the optical transmitter is calculated based on the testing eye pattern and the noise enhancement coefficient that corresponds to the equalization compensation, where the testing eye pattern is obtained through composition using the testing symbol pattern on which the equalization compensation has been performed. As such, it can be determined, based on the value of the first parameter, whether the optical signal transmitted by the optical transmitter using the NRZ-PAM2 scheme can meet the use requirement of the optical receiver when the optical receiver uses the equalization receiving manner.

Figure 6:
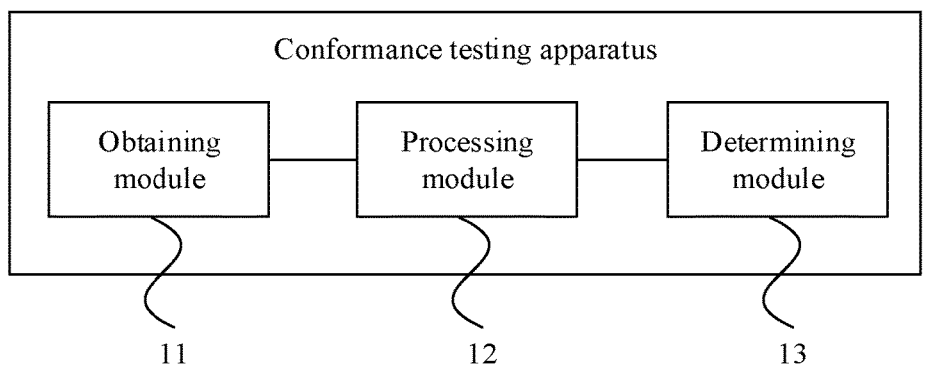
FIG. 6 is a schematic structural diagram of a conformance testing apparatus according to an embodiment of this application.

FIG. 6 is a schematic structural diagram of a conformance testing apparatus according to an embodiment of this application. The conformance testing apparatus in this embodiment may be the processing device described above, or may be a chip applied to the processing device. The conformance testing apparatus may be configured to perform an action of the processing device in the foregoing method embodiments. As shown in FIG. 6, the communications apparatus may include an obtaining module 11, a processing module 12, and a determining module 13.

The obtaining module 11 is configured to obtain a testing symbol pattern in an optical signal transmitted by an optical transmitter, where the optical signal is generated by the optical transmitter through modulation using a non-return to zero pulse amplitude modulation 2-level scheme.

The processing module 12 is configured to: perform equalization compensation on the testing symbol pattern, and obtain a testing eye pattern through composition using a testing symbol pattern on which the equalization compensation has been performed; and calculate a value of a first parameter based on the testing eye pattern and a noise enhancement coefficient that corresponds to the equalization compensation, where the first parameter is used to determine a transmitter dispersion eye pattern closure degree of the optical transmitter. The noise enhancement coefficient corresponding to the equalization compensation described herein may be, for example, determined based on normalized noise power spectrum density that is of an input end and that corresponds to the equalization compensation and a normalized frequency response corresponding to the equalization compensation. For example, the noise enhancement coefficient is determined according to $C_{eq}=\sqrt{\int_f N(f) \times H_{eq}(f) df}$, or the noise enhancement coefficient is determined according to $C_{eq}=\sqrt{\int_f N(f) \times |H_{eq}(f)|^2 df}$, where $f$ is a frequency, $N(f)$ is the normalized noise power spectrum density that is of the input end and that corresponds to the equalization compensation, $H_{eq}(f)$ is the normalized frequency response corresponding to the equalization compensation, $\int_f N(f) df$ is equal to 1, and $H_{eq}(f)$ is equal to 1 when $f$ is equal to 0.

The determining module 13 is configured such that when the value of the first parameter is less than or equal to a preset threshold, the determining module 13 determines that conformance testing on the optical signal succeeds.

In a possible implementation, if the optical signal is transmitted by the optical transmitter under highest relative intensity noise, that the conformance testing on the optical signal succeeds is used to represent that conformance testing on the optical transmitter succeeds.

In a possible implementation, the processing module 12 is configured to: construct a histogram of a first sampling window, a histogram of a second sampling window, a histogram of a third sampling window, and a histogram of a fourth sampling window based on the testing eye pattern; determine a first standard deviation based on the histogram of the first sampling window, the histogram of the second sampling window, the histogram of the third sampling window, the histogram of the fourth sampling window, and the noise enhancement coefficient; determine, based on the first standard deviation, a standard deviation of highest additive noise that can be supported by the optical transmitter when a target bit error rate is reached; and determine the value of the first parameter based on the standard deviation of the highest additive noise that can be supported by the optical transmitter when the target bit error rate is reached. The first sampling window and the second sampling window are vertically symmetrically distributed on a left part of the testing eye pattern, the third sampling window and the fourth sampling window are vertically symmetrically distributed on a right part of the testing eye pattern, the first standard deviation is a smaller value in a second standard deviation and a third standard deviation, the second standard deviation is a standard deviation of highest additive noise that can be supported by the optical transmitter when the first sampling window and the second sampling window reach the target bit error rate, and the third standard deviation is a standard deviation of highest additive noise that can be supported by the optical transmitter when the third sampling window and the fourth sampling window reach the target bit error rate.

For example, the processing module 12 is configured to: determine the second standard deviation based on the histogram of the first sampling window, the histogram of the second sampling window, and the noise enhancement coefficient; determine the third standard deviation based on the histogram of the third sampling window, the histogram of the fourth sampling window, and the noise enhancement coefficient; and use the smaller value in the second standard deviation and the third standard deviation as the first standard deviation.

It is assumed that all sampling points included in the first sampling window are located on an upper eyelid on the testing eye pattern and are higher than an average optical power of the testing eye pattern, all sampling points included in the second sampling window are located on a lower eyelid on the testing eye pattern and are lower than the average optical power of the testing eye pattern. The processing module 12 may determine the value of the first parameter in the following two manners. Details are as follows.

Manner 1: The processing module 12 may determine a histogram distribution function of the first sampling window based on the histogram of the first sampling window, determine a histogram distribution function of the second sampling window based on the histogram of the second sampling window, and determine the second standard deviation based on the histogram distribution function of the first sampling window, the histogram distribution function of the second sampling window, the target bit error rate, and a normal distribution curve function.

The normal distribution curve function is determined based on the noise enhancement coefficient, the average optical power of the testing eye pattern, and the second standard deviation. For example, the normal distribution curve function is determined according to $$Q(x) = \int_x^\infty \frac{(-z^2/2)}{\sqrt{2\pi}} dz.$$

Q(x) is the normal distribution curve function, $$x = \frac{y - P_{ave}}{C_{eq} \cdot \sigma_L},$$

y is an independent variable of x, a value range of y is an interval between a largest value and a smallest value in optical power values corresponding to the sampling points in the first sampling window and the second sampling window, $P_{ave}$ is the average optical power of the testing eye pattern, $\sigma_L$ is the second standard deviation, $C_{eq}$ is the noise enhancement coefficient, and z is an integral variable of the normal distribution curve function.

In this manner, the processing module 12 may determine, through numerical simulation, the second standard deviation meeting a first formula. The first formula is:

$$\frac{1}{2}\left(\frac{\int f_{ul}(y)Q(x)dy}{\int f_{ul}(y)dy}\right) + \frac{1}{2}\left(\frac{\int f_{ll}(y)Q(x)dy}{\int f_{ll}(y)dy}\right) = BER_{target}.$$

$f_{ul}(y)$ is the histogram distribution function of the first sampling window, Q(x) is the normal distribution curve function, $f_{ll}(y)$ is the histogram distribution function of the second sampling window, and $BER_{target}$ is the target bit error rate.

In this manner, the processing module 12 may determine, based on the first standard deviation and a fourth standard deviation, the standard deviation of the highest additive noise that can be supported by the optical transmitter when the target bit error rate is reached, where the fourth standard deviation is a variance of base noise sums of an optical receiver side. For example, the processing module 12 is configured to calculate a square root of a sum of the square of the first standard deviation and the square of the fourth standard deviation, to obtain the standard deviation of the highest additive noise that can be supported by the optical transmitter when the target bit error rate is reached.

In this manner, the processing module 12 may determine the value of the first parameter according to $$T = 10\log_{10}\left(\frac{OMA}{2Q} \times \frac{1}{R}\right) + M.$$

T is the first parameter, OMA is an optical modulation amplitude, Q is a preset Q factor, R is the standard deviation of the highest additive noise that can be supported by the optical transmitter when the target bit error rate is reached, M is a first compensation factor, and M is determined based on an extinction ratio of the testing eye pattern. The preset Q factor described herein may be, for example, a Q factor of a preset eye pattern under the target bit error rate, and the preset eye pattern is an eye pattern that is free of intersymbol interference and noise.

Manner 2: The processing module 12 may determine a histogram distribution function of the first sampling window based on the histogram of the first sampling window, determine a histogram distribution function of the second sampling window based on the histogram of the second sampling window, and determine the second standard deviation based on the histogram distribution function of the first sampling window, the histogram distribution function of the second sampling window, the target bit error rate, a normal distribution curve function of the first sampling window, and a normal distribution curve function of the second sampling window.

The normal distribution curve function of the first sampling window is determined based on the noise enhancement coefficient, a preset optical power threshold, the second standard deviation, and a second compensation factor. The second compensation factor is determined based on an extinction ratio of the testing eye pattern. For example, the normal distribution curve function of the first sampling window is determined according to $$Q(x_{ul}) = \int_{x_{ul}}^{\infty} \frac{(-z^2/2)}{\sqrt{2\pi}} dz.$$

The normal distribution curve function of the second sampling window is determined based on the noise enhancement coefficient, the preset optical power threshold, and the second standard deviation. For example, the normal distribution curve function of the second sampling window is determined according to $$Q(x_{ll}) = \int_{x_{ll}}^{\infty} \frac{(-z^2/2)}{\sqrt{2\pi}} dz.$$

$Q(x_{ul})$ is the normal distribution curve function of the first sampling window, $$x_{ul} = \frac{y - P_{th}}{C_{eq} \cdot M_1 \cdot \sigma_L},$$

$Q(x_{ll})$ is the normal distribution curve function of the second sampling window, $$x_{ll} = \frac{P_{th} - y}{C_{eq} \cdot \sigma_L},$$

y is an independent variable of $x_{ul}$ and $x_{ll}$, a value range of y is an interval between largest value and a smallest value in optical power values corresponding to the sampling points in the first sampling window and the second sampling window, $P_{th}$ is the preset optical power threshold, $\sigma_L$ is the second standard deviation, $C_{eq}$ is the noise enhancement coefficient, $M_1$ is the second compensation factor, and z is an integral variable of the normal distribution curve function.

In this manner, the processing module 12 may determine, through numerical simulation, the second standard deviation meeting a second formula, where the second formula is:

$$\frac{1}{2}\left(\frac{\int f_{ul}(y)Q(x_{ul})dy}{\int f_{ul}(y)dy}\right) + \frac{1}{2}\left(\frac{\int f_{ll}(y)Q(x_{ll})dy}{\int f_{ll}(y)dy}\right) = BER_{target}.$$

$f_{ul}(y)$ is the histogram distribution function of the first sampling window, $f_{ll}(y)$ is the histogram distribution function of the second sampling window, and $BER_{target}$ is the target bit error rate.

In this manner, the processing module 12 may determine, based on the first standard deviation, the second compensation factor, and a fourth standard deviation, the standard deviation of the highest additive noise that can be supported by the optical transmitter when the target bit error rate is reached, where the fourth standard deviation is a variance of base noise sums of an optical receiver side. For example, the processing module 12 is configured to determine, according to $R = \sqrt{[(1+M_1)\sigma_G]^2 + \sigma_S^2}$, the standard deviation of the highest additive noise that can be supported by the optical transmitter when the target bit error rate is reached, where R is the standard deviation of the highest additive noise that can be supported by the optical transmitter when the target bit error rate is reached, $M_1$ is the second compensation factor, $\sigma_G$ is the first standard deviation, and $\sigma_S$ is the fourth standard deviation.

In this manner, the processing module 12 may determine the value of the first parameter according to $$T = 10\log_{10}\left(\frac{R_{preset}}{R}\right).$$

T is the first parameter, $R_{preset}$ is a standard deviation of highest additive noise that can be supported by a preset optical transmitter when the target bit error rate is reached, R is the standard deviation of the highest additive noise that can be supported by the optical transmitter when the target bit error rate is reached, and an optical signal transmitted by the preset optical transmitter is free of noise, jittering, and inter-symbol interference.

In this manner, the processing module 12 is further configured to: obtain a preset eye pattern that is obtained based on the optical signal transmitted by the preset optical transmitter; and determine, based on a normal distribution curve function of an upper eyelid on the preset eye pattern, a normal distribution curve function of a lower eyelid on the preset eye pattern, and the target bit error rate, the standard deviation of the highest additive noise that can be supported by the preset optical transmitter when the target bit error rate is reached. For example, the processing module 12 is configured to determine, through numerical simulation, a first standard deviation that meets a third formula and that corresponds to the preset optical transmitter, and determine, based on the first standard deviation corresponding to the preset optical transmitter, the standard deviation of the highest additive noise that can be supported by the preset optical transmitter when the target bit error rate is reached, where the third formula is: $\frac{1}{2}[Q(x_u)+Q(x_l)]=BER_{target}$.

$Q(x_u)$ is the normal distribution curve function of the upper eyelid on the preset eye pattern, $$Q(x_u) = \int_{x_u}^{\infty} \frac{(-z^2/2)}{\sqrt{2\pi}} dz, x_u = \frac{P_{u_{ideal}} - P_{th}}{M_2 \cdot \sigma_{ideal}},$$

$Q(x_l)$ is the normal distribution curve function of the lower eyelid on the preset eye pattern, $$Q(x_l) = \int_{x_l}^{\infty} \frac{(-z^2/2)}{\sqrt{2\pi}} dz, x_l = \frac{P_{th} - P_{l_{ideal}}}{\sigma_{ideal}},$$

$P_{u_{ideal}}$ is an average optical power value of the upper eyelid on the preset eye pattern, $P_{l_{ideal}}$ is an average optical power value of the lower eyelid on the preset eye pattern, $P_{th}$ is the preset optical power threshold, $\sigma_{ideal}$ is the first standard deviation corresponding to the preset optical transmitter, z is an integral variable of the normal distribution curve function, $M_2$ is a third compensation factor, and the third compensation factor is determined based on an extinction ratio of the preset eye pattern.

The conformance testing apparatus provided in this embodiment of this application may perform an action of the processing device in the foregoing method embodiments, and an implementation principle and a technical effect are similar. Details are not described herein again.

It should be noted that, the foregoing modules may be implemented in the form of software invoked by a processing element, or may be implemented in the form of hardware. For example, the processing module may be a separately disposed processing element, or may be integrated into a chip of the foregoing apparatus for implementation. In addition, the processing module may be stored in a memory of the foregoing apparatus in the form of program code, and is invoked by a processing element of the foregoing apparatus to perform a function of the processing unit. In addition, some or all of the units may be integrated together, or the units may be implemented independently. The processing element may be an integrated circuit and has a signal processing capability. In an implementation process, steps in the foregoing methods or the foregoing units can be implemented using a hardware integrated logical circuit in the processing element, or using instructions in the form of software.

For example, the foregoing units may be configured as one or more integrated circuits for implementing the method, such as one or more application-specific integrated circuits (ASIC), one or more digital signal processors (DSP), or one or more field programmable gate arrays (FPGA). For another example, when a unit is implemented by scheduling program code by a processing component, the processing component may be a general-purpose processor, for example, a central processing unit (CPU) or another processor that can invoke the program code. For still another example, the units may be integrated and implemented in the form of a system on a chip (SOC).

Figure 7:
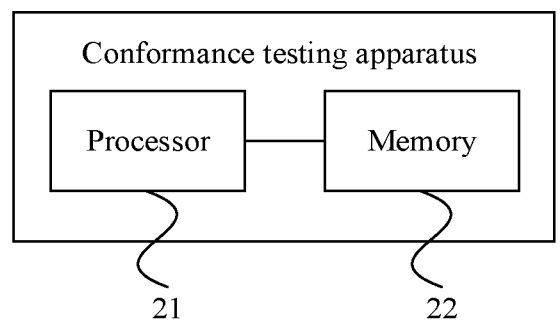
FIG. 7 is a schematic structural diagram of another conformance testing apparatus according to an embodiment of this application.

FIG. 7 is a schematic structural diagram of another conformance testing apparatus according to an embodiment of this application. As shown in FIG. 7, the conformance testing apparatus may include at least one processor 21, a memory 22, and the like. FIG. 7 shows an example of a conformance testing apparatus including one processor. In addition, a person skilled in the art may understand that a structure of the conformance testing apparatus shown in FIG. 7 constitutes no limitation on the conformance testing apparatus, and the conformance testing apparatus may include more or fewer components than those shown in the figure, or some components may be combined, or different component deployments may be used. This is not limited.

The processor 21 may be a CPU, or an ASIC, or one or more integrated circuits configured to implement this embodiment of this application. The memory 22 may include a high-speed random-access memory (RAM), or may further include a non-volatile memory (NVM), for example, at least one magnetic disk storage. The memory 22 may store various instructions, to complete various processing functions and implement method steps of this application.

In this embodiment of this application, the memory 22 is configured to store computer-executable program code, and the program code includes an instruction. When the processor 21 executes the instruction, the instruction enables the processor 21 of the conformance testing apparatus to perform an action of the processing device in the foregoing method embodiments. Implementation principles and technical effects thereof are similar, and details are not described herein again.

During implementation, if the memory 22 and the processor 21 are independently implemented, the memory 22 and the processor 21 may be connected to each other and communicate with each other through a bus. The bus may be an industry standard architecture (ISA) bus, a peripheral component interconnect (PCI) bus, an extended industry standard architecture (EISA) bus, or the like. The bus may be classified into an address bus, a data bus, a control bus, and the like, but it does not indicate that there is only one bus or only one type of bus. If the memory 22 and the processor 21 are integrated into one chip for implementation, the memory 22 and the processor 21 may communicate with each other through an internal interface.

An embodiment of this application further provides a computer readable storage medium. The computer readable storage medium may include various media that can store program code, such as a Universal Serial Bus (USB) flash drive, a removable hard disk, a read-only memory (ROM), a random-access memory (RAM), a magnetic disk, or an optical disc. For example, the computer readable storage medium stores a program instruction, and the program instruction is used in the method in the foregoing embodiments.

All or some of the foregoing embodiments may be implemented using software, hardware, firmware, or any combination thereof. When software is used to implement the embodiments, the embodiments may be implemented completely or partially in the form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

"A plurality of" in this application refers to two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

It may be understood that numerical symbols used in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A transmitter dispersion eye pattern closure degree testing method, comprising:

obtaining, from an optical transmitter, a testing symbol pattern in an optical signal;

performing equalization compensation on the testing symbol pattern to obtain an equalized testing symbol pattern;

generating a testing eye pattern through composition using the equalized testing symbol pattern; and calculating, based on the testing eye pattern and a noise enhancement coefficient that corresponds to the equalization compensation, a value of a first parameter, wherein the first parameter is for determining a transmitter dispersion eye pattern closure degree of the optical transmitter.

2. The transmitter dispersion eye pattern closure degree testing method of claim 1, wherein conformance testing on the optical transmitter succeeds when the optical signal is transmitted by the optical transmitter under highest relative intensity noise and the value of the first parameter is less than or equal to a preset threshold.

3. The transmitter dispersion eye pattern closure degree testing method of claim 1, wherein calculating the value of the first parameter comprises:

constructing, based on the testing eye pattern, a first histogram of a first sampling window, a second histogram of a second sampling window, a third histogram of a third sampling window, and a fourth histogram of a fourth sampling window, wherein the first sampling window and the second sampling window are vertically symmetrically distributed on a left part of the testing eye pattern, and wherein the third sampling window and the fourth sampling window are vertically symmetrically distributed on a right part of the testing eye pattern;

determining a first standard deviation based on the first histogram, the second histogram, the third histogram, the fourth histogram, and the noise enhancement coefficient, wherein the first standard deviation is a smaller value in a second standard deviation and a third standard deviation, wherein the second standard deviation is of a second highest additive noise that can be supported by the optical transmitter when the first sampling window and the second sampling window reach a target bit error rate, and wherein the third standard deviation is of a third highest additive noise that can be supported by the optical transmitter when the third sampling window and the fourth sampling window reach the target bit error rate;

determining, based on the first standard deviation, a standard deviation of a first highest additive noise that can be supported by the optical transmitter when the target bit error rate is reached; and determining the value of the first parameter based on the standard deviation of the first highest additive noise.

4. The transmitter dispersion eye pattern closure degree testing method of claim 3, wherein determining the first standard deviation comprises:

determining the second standard deviation based on the first histogram, the second histogram, and the noise enhancement coefficient;

determining the third standard deviation based on the third histogram, the fourth histogram, and the noise enhancement coefficient; and using the smaller value in the second standard deviation and the third standard deviation as the first standard deviation.

5. The transmitter dispersion eye pattern closure degree testing method of claim 4, wherein all sampling points in the first sampling window are located on an upper eyelid on the testing eye pattern and are higher than an average optical power of the testing eye pattern, wherein all sampling points in the second sampling window are located on a lower eyelid on the testing eye pattern and are lower than the average optical power of the testing eye pattern, and wherein determining the second standard deviation comprises:

determining a first histogram distribution function of the first sampling window based on the first histogram;

determining a second histogram distribution function of the second sampling window based on the second histogram; and determining the second standard deviation based on the first histogram distribution function, the second histogram distribution function, the target bit error rate, and a normal distribution curve function, wherein the normal distribution curve function is based on the noise enhancement coefficient, the average optical power of the testing eye pattern, and the second standard deviation.

6. The transmitter dispersion eye pattern closure degree testing method of claim 5, further comprising determining the normal distribution curve function according to a formula comprising:

$$Q(x) = \int_x^\infty \frac{(-z^2/2)}{\sqrt{2\pi}} dz,$$

wherein Q(x) is the normal distribution curve function, wherein $$x = \frac{y - p_{ave}}{C_{eq} \cdot \sigma_L},$$

wherein y is an independent variable of x, wherein a value range of y is an interval between a largest value and a smallest value in optical power values corresponding to the sampling points in the first sampling window and the second sampling window, wherein $P_{ave}$ is the average optical power of the testing eye pattern, wherein $\sigma_L$ is the second standard deviation, wherein $C_{eq}$ is the noise enhancement coefficient, and wherein z is an integral variable of the normal distribution curve function.

7. The transmitter dispersion eye pattern closure degree testing method of claim 6, wherein determining the second standard deviation comprises determining, through numerical simulation, that the second standard deviation meets a first formula comprising:

$$\frac{1}{2}\left(\frac{\int f_{ul}(y)Q(x)dy}{\int f_{ul}(y)dy}\right) + \frac{1}{2}\left(\frac{\int f_{ll}(y)Q(x)dy}{\int f_{ll}(y)dy}\right) = BER_{target},$$

wherein $f_{ul}(y)$ is the first histogram distribution function, wherein Q(x) is the normal distribution curve function, wherein $f_u(y)$ is the second histogram distribution function, and wherein $BER_{target}$ is the target bit error rate.

8. The transmitter dispersion eye pattern closure degree testing method of claim 4, wherein all sampling points in the first sampling window are located on an upper eyelid on the testing eye pattern and are higher than an average optical power of the testing eye pattern, wherein all sampling points in the second sampling window are located on a lower eyelid on the testing eye pattern and are lower than the average optical power of the testing eye pattern, and wherein determining the second standard deviation comprises:
determining a first histogram distribution function of the first sampling window based on the first histogram;
determining a second histogram distribution function of the second sampling window based on the second histogram; and
determining the second standard deviation based on the first histogram distribution function, the second histogram distribution function, the target bit error rate, a first normal distribution curve function of the first sampling window, and a second normal distribution curve function of the second sampling window, wherein the first normal distribution curve function is based on the noise enhancement coefficient, a preset optical power threshold, the second standard deviation, and a second compensation factor, wherein the second normal distribution curve function is based on the noise enhancement coefficient, the preset optical power threshold, and the second standard deviation, and wherein the second compensation factor is based on an extinction ratio of the testing eye pattern.

9. The transmitter dispersion eye pattern closure degree testing method of claim 8, wherein determining the standard deviation of the first highest additive noise comprises determining, based on the first standard deviation, the second compensation factor, and a fourth standard deviation, the standard deviation of the first highest additive noise that can be supported by the optical transmitter when the target bit error rate is reached, and wherein the fourth standard deviation is of base noise sums of an optical receiver side.

10. The transmitter dispersion eye pattern closure degree testing method of claim 9, wherein determining the standard deviation of the first highest additive noise further comprises determining, according to $R=\sqrt{[(1+M_1)\sigma_G]^2+\sigma_S^2}$, the standard deviation of the first highest additive noise that can be supported by the optical transmitter when the target bit error rate is reached, wherein R is the standard deviation of the first highest additive noise that can be supported by the optical transmitter when the target bit error rate is reached, wherein $M_1$ is the second compensation factor, wherein $\sigma_G$ is the first standard deviation, and wherein $\sigma_S$ is the fourth standard deviation.

11. The transmitter dispersion eye pattern closure degree testing method of claim 3, wherein determining the value of the first parameter based on the standard deviation of the first highest additive noise comprises determining the value of the first parameter according to a formula comprising:

$$T = 10\log_{10}\left(\frac{OMA}{2Q} \times \frac{1}{R}\right) + M,$$

wherein T is the first parameter, wherein OMA is an optical modulation amplitude, wherein Q is a preset Q factor, wherein R is the standard deviation of the first highest additive noise that can be supported by the optical transmitter when the target bit error rate is reached, and wherein M is a first compensation factor determined based on an extinction ratio of the testing eye pattern.

12. The transmitter dispersion eye pattern closure degree testing method of claim 11, wherein the preset Q factor is of a preset eye pattern under the target bit error rate, and wherein the preset eye pattern is free of inter-symbol interference and noise.

13. The transmitter dispersion eye pattern closure degree testing method of claim 3, wherein determining the standard deviation of the first highest additive noise comprises determining, based on the first standard deviation and a fourth standard deviation, the standard deviation of the first highest additive noise that can be supported by the optical transmitter when the target bit error rate is reached, and wherein the fourth standard deviation is of base noise sums of an optical receiver side.

14. The transmitter dispersion eye pattern closure degree testing method of claim 13, wherein determining the standard deviation of the first highest additive noise further comprises calculating a square root of a sum of a first square of the first standard deviation and a fourth square of the fourth standard deviation, to obtain the standard deviation of the first highest additive noise that can be supported by the optical transmitter when the target bit error rate is reached.

15. A transmitter dispersion eye pattern closure degree testing apparatus, comprising:
a memory configured to store instructions; and
a processor coupled to the memory and configured to execute the instructions to cause the transmitter dispersion eye pattern closure degree testing apparatus to:
obtain, from an optical transmitter, a testing symbol pattern in an optical signal;
perform equalization compensation on the testing symbol pattern to obtain an equalized testing symbol pattern;
generate a testing eye pattern through composition using the equalized testing symbol pattern; and
calculate a value of a first parameter based on the testing eye pattern and a noise enhancement coefficient that corresponds to the equalization compensation, wherein the first parameter is for determining a transmitter dispersion eye pattern closure degree of the optical transmitter.

16. The transmitter dispersion eye pattern closure degree testing apparatus of claim 15, wherein conformance testing on the optical transmitter succeeds when the optical signal is transmitted by the optical transmitter under highest relative intensity noise and the value of the first parameter is less than or equal to a preset threshold.

17. The transmitter dispersion eye pattern closure degree testing apparatus of claim 15, wherein the processor further executes the instructions to cause the transmitter dispersion eye pattern closure degree testing apparatus to:
construct, based on the testing eye pattern, a first histogram of a first sampling window, a second histogram of a second sampling window, a third histogram of a third sampling window, and a fourth histogram of a fourth sampling window;
determine a first standard deviation based on the first histogram, the second histogram, the third histogram, the fourth histogram, and the noise enhancement coefficient;

determine, based on the first standard deviation, a standard deviation of first highest additive noise that can be supported by the optical transmitter when a target bit error rate is reached; and determine the value of the first parameter based on the standard deviation of the first highest additive noise that can be supported by the optical transmitter when the target bit error rate is reached, wherein the first sampling window and the second sampling window are vertically symmetrically distributed on a left part of the testing eye pattern, wherein the third sampling window and the fourth sampling window are vertically symmetrically distributed on a right part of the testing eye pattern, wherein the first standard deviation is a smaller value in a second standard deviation and a third standard deviation, wherein the second standard deviation is of a second highest additive noise that can be supported by the optical transmitter when the first sampling window and the second sampling window reach the target bit error rate, and wherein the third standard deviation is of a third highest additive noise that can be supported by the optical transmitter when the third sampling window and the fourth sampling window reach the target bit error rate.

18. The transmitter dispersion eye pattern closure degree testing apparatus of claim 17, wherein the processor further executes the instructions to cause the transmitter dispersion eye pattern closure degree testing apparatus to determine the value of the first parameter according to a formula comprising:

$$T = 10\log_{10}\left(\frac{OMA}{2Q} \times \frac{1}{R}\right) + M,$$

wherein T is the first parameter, wherein OMA is an optical modulation amplitude, wherein Q is a preset Q factor, wherein R is the standard deviation of the first highest additive noise that can be supported by the optical transmitter when the target bit error rate is reached, and wherein M is a first compensation factor determined based on an extinction ratio of the testing eye pattern.

19. The transmitter dispersion eye pattern closure degree testing apparatus of claim 17, wherein the processor further executes the instructions to cause the transmitter dispersion eye pattern closure degree testing apparatus to determine the value of the first parameter according to a formula comprising:

$$T = 10\log_{10}\left(\frac{R_{preset}}{R}\right),$$

wherein T is the first parameter, wherein $R_{preset}$ is a fourth standard deviation of highest additive noise that can be supported by a preset optical transmitter when the target bit error rate is reached, wherein R is the standard deviation of the first highest additive noise that can be supported by the optical transmitter when the target bit error rate is reached, and wherein a second optical signal transmitted by the preset optical transmitter is free of noise, jittering, and intersymbol interference.

20. A non-transitory computer readable medium configured to store instructions executable by a computer to implement a method comprising:

obtaining, from an optical transmitter, a testing symbol pattern in an optical signal;

performing equalization compensation on the testing symbol pattern to obtain an equalized testing symbol pattern;

generating a testing eye pattern through composition using the equalized testing symbol pattern; and calculating, based on the testing eye pattern and a noise enhancement coefficient that corresponds to the equalization compensation, a value of a first parameter, wherein the first parameter is for determining a transmitter dispersion eye pattern closure degree of the optical transmitter.

* * * * *

UNITED STATES PATENT AND TRADEMARK OFFICE
CERTIFICATE OF CORRECTION

Page 1 of 1

PATENT NO. : 11,764,871 B2
APPLICATION NO. : 17/709036
DATED : September 19, 2023
INVENTOR(S) : Jianyu Zheng, Shengping Li and Ting Yang It is certified that error appears in the above-identified patent and that said Letters Patent is hereby corrected as shown below:

In the Claims

Claim 7, Column 47, Line 2: "wherein $f_u(y)$ is the" should read "wherein $f_{ll}(y)$ is the"

Signed and Sealed this
Second Day of July, 2024

Katherine Kelly Vidal
*Director of the United States Patent and Trademark Office*